US010261741B2

(12) United States Patent
Carlos et al.

(10) Patent No.: US 10,261,741 B2
(45) Date of Patent: Apr. 16, 2019

(54) CONTENT SHARING WITH CONSISTENT ASPECT RATIOS

(71) Applicant: Prysm, Inc., San Jose, CA (US)

(72) Inventors: Dino C. Carlos, Fischers, IN (US); Adam P. Cuzzort, Westfield, IN (US); Brandon Fischer, Carmel, IN (US)

(73) Assignee: PRYSM, INC, San Jose, CA (US)

( * ) Notice: Subject to any disclaimer, the term of this patent is extended or adjusted under 35 U.S.C. 154(b) by 181 days.

(21) Appl. No.: 15/013,911

(22) Filed: Feb. 2, 2016

(65) Prior Publication Data

US 2016/0232646 A1 Aug. 11, 2016

Related U.S. Application Data

(60) Provisional application No. 62/114,024, filed on Feb. 9, 2015, provisional application No. 62/148,476, filed on Apr. 16, 2015.

(51) Int. Cl.
*G06T 3/40* (2006.01)
*G06T 3/20* (2006.01)
*G06F 3/14* (2006.01)

(52) U.S. Cl.
CPC .......... *G06F 3/1423* (2013.01); *G06F 3/1454* (2013.01)

(58) Field of Classification Search
CPC .................................................... G06F 3/1423
USPC ....................................................... 345/660
See application file for complete search history.

(56) References Cited

U.S. PATENT DOCUMENTS

| 8,963,953 | B2 * | 2/2015 | Agar | H04N 1/00167 |
| | | | | 345/629 |
| 2005/0192052 | A1 * | 9/2005 | Tenhunen | H04L 29/06027 |
| | | | | 455/557 |
| 2005/0243209 | A1 * | 11/2005 | Iwahashi | H04N 5/4403 |
| | | | | 348/556 |
| 2009/0271275 | A1 * | 10/2009 | Regmi | G06Q 20/209 |
| | | | | 705/14.73 |

(Continued)

FOREIGN PATENT DOCUMENTS

WO 2014188050 A1 11/2014

OTHER PUBLICATIONS

International search report and written opinion for application No. PCT/US2016/017025 dated Jul. 1, 2016.

*Primary Examiner* — Javid A Amini
(74) *Attorney, Agent, or Firm* — Artegis Law Group, LLP

(57) ABSTRACT

An appliance device to display a workspace with an aspect ratio assigned to the workspace, regardless of the aspect ratio of a local display. The appliance device displays only a portion of the workspace in a viewport window at one time. The appliance device also displays a preview version of the entire workspace. The preview version comprises a user-interface tool which enables panning of the workspace in the viewport window. A presenter device makes a presentation while interacting with a workspace while viewer devices watch the presentation. A viewer device displays the workspace with the assigned aspect ratio and displays only portion of the workspace at one time. When the presenter device interacts with a location of the workspace, the presenter device operates in conjunction with a messaging infrastructure and the viewer devices to automatically cause each of the viewer devices to display the location of interaction in the workspace.

25 Claims, 18 Drawing Sheets

(56) References Cited

U.S. PATENT DOCUMENTS

| | | | |
|---|---|---|---|
| 2012/0062688 A1* | 3/2012 | Shen | G06F 3/04886 |
| | | | 348/14.03 |
| 2012/0162354 A1 | 6/2012 | Agarwal et al. | |
| 2013/0002532 A1* | 1/2013 | Raffle | G06F 3/1423 |
| | | | 345/156 |
| 2013/0024418 A1* | 1/2013 | Sitrick | G06Q 10/101 |
| | | | 707/608 |
| 2013/0218998 A1 | 8/2013 | Fischer et al. | |
| 2013/0290860 A1* | 10/2013 | Lethers | G06F 19/321 |
| | | | 715/744 |
| 2014/0033133 A1* | 1/2014 | Pegg | H04M 3/567 |
| | | | 715/863 |
| 2014/0282229 A1* | 9/2014 | Laukkanen | G06F 3/0481 |
| | | | 715/788 |
| 2014/0300643 A1* | 10/2014 | Urosev | G06T 11/006 |
| | | | 345/660 |
| 2015/0033146 A1 | 1/2015 | Wu et al. | |
| 2015/0067591 A1* | 3/2015 | Nancke-Krogh | G06F 3/0481 |
| | | | 715/804 |
| 2015/0149929 A1* | 5/2015 | Shepherd | H04L 65/403 |
| | | | 715/753 |
| 2015/0153996 A1* | 6/2015 | Miki | G09G 5/12 |
| | | | 345/634 |
| 2016/0117371 A1* | 4/2016 | Couris | G06F 17/30383 |
| | | | 707/602 |
| 2016/0232647 A1* | 8/2016 | Carlos | G06F 3/1454 |

* cited by examiner

CONTENT SHARING WITH CONSISTENT ASPECT RATIOS

CROSS-REFERENCE TO RELATED APPLICATIONS

This application claims the benefit of U.S. provisional patent application titled "REMOTE WINDOW DPI WITHIN LOCAL WINDOW," filed on Feb. 9, 2015 and having Ser. No. 62/114,024. The subject matter of this related application is hereby incorporated herein by reference. This application also claims the benefit of U.S. provisional patent application titled "REMOTE WINDOW DPI WITHIN LOCAL WINDOW AND RELATED FEATURES," filed on Apr. 16, 2015 and having Ser. No. 62/148,476. The subject matter of this related application is hereby incorporated herein by reference.

BACKGROUND OF THE INVENTION

Field of the Invention

The present invention generally relates to sharing digital content and, more specifically, to content sharing with consistent aspect ratios.

Description of the Related Art

Currently, digital content may be shared between different computer devices implementing various techniques. During a content sharing session, a shared workspace that includes various types of digital content may be displayed on multiple computer devices at different physical locations, or a shared workspace displayed on one computer device may be shared with different remote computer devices. In conventional content sharing systems, a shared workspace having a particular aspect ratio is usually displayed with the aspect ratio associated with the display of the local computer device that renders and displays the shared workspace to users who are present in the same physical location as the local computer device. In effect, the aspect ratio of the shared workspace that is originally generated is converted to the aspect ratio of the local display implementing various conversion techniques, such as pan operations and/or scan operations. For example, the original aspect ratio of a shared workspace of 16:9 may be converted to an aspect ratio of 4:3 associated with a local display implementing one or more pan and/or scan operations. Typically, when converting the aspect ratio of a shared workspace in such a fashion implementing conventional techniques, a substantial amount of information included within the shared workspace may be lost.

In addition, when converting the aspect ratio of a shared workspace to the aspect ratio associated with a local display, the original configuration and layout of the shared workspace can appear differently at any local computer device having a display that has an aspect ratio different than the aspect ratio of the originally generated shared workspace. In the same vein, when a shared workspace is displayed on local computer devices having displays of differing aspect ratios, the shared workspace is displayed in different aspect ratios across those different local computer devices. Consequently, the layout and overall appearance of the shared workspace can be different at each such local computer device. This result is less than optimal given that a consistent configuration and layout of the shared workspace is desired at each local computer device displaying the shared workspace so that, among other things, the user experience can be as similar as possible across all persons participating in the content sharing session.

As the foregoing illustrates, what is needed in the art are more effective techniques for displaying shared workspaces more consistently on computer devices.

SUMMARY OF THE INVENTION

Various embodiments of the present invention include a computer-implemented method for sharing a first shared workspace with one or more client devices. The method includes displaying a portion of the first workspace within a first display associated with a first client device. The first display has a smaller aspect ratio than an assigned aspect ratio associated with the first workspace. The method further includes, while displaying the portion of the first workspace, displaying a first preview version of the entirety of the first workspace in a preview window displayed within the first display. The preview window allows panning to different portions of the first workspace.

At least one advantage of the disclosed technique is that the original aspect ratio of a shared workspace can be maintained at each computer device sharing the shared workspace regardless of the aspect ratio of the display associated with the local computer device. Among other things, with the disclosed technique, less information is lost, and the layout and appearance of the shared workspace are more consistent across different local computer devices, relative to conventional approaches and techniques.

Various embodiments of the present invention include a computer-implemented method for sharing content across different devices. The method includes displaying a first portion of the workspace within a display associated with a first device. The method also includes receiving, at the first device, a message indicating that an interaction at a first location within the workspace is transpiring via a second device. The method further includes displaying a second portion of the workspace within the display associated with the first device based on the first location.

At least one advantage of the disclosed technique is that during a presentation of a shared workspace by a presenter appliance, the original aspect ratio of the shared workspace is maintained at each viewer appliance to maintain a consistent layout appearance, while also enabling automatic panning to and display of locations of presenter interactions in the shared workspace at each viewer appliance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into three subsections. Section I is a system overview describing a collaborative appliance and collaboration system. Section II describes techniques for a preview feature for displaying and panning a shared workspace. Section III describes techniques for a presentation feature for presenting a shared workspace to remote clients.

System Overview

Figure 1:
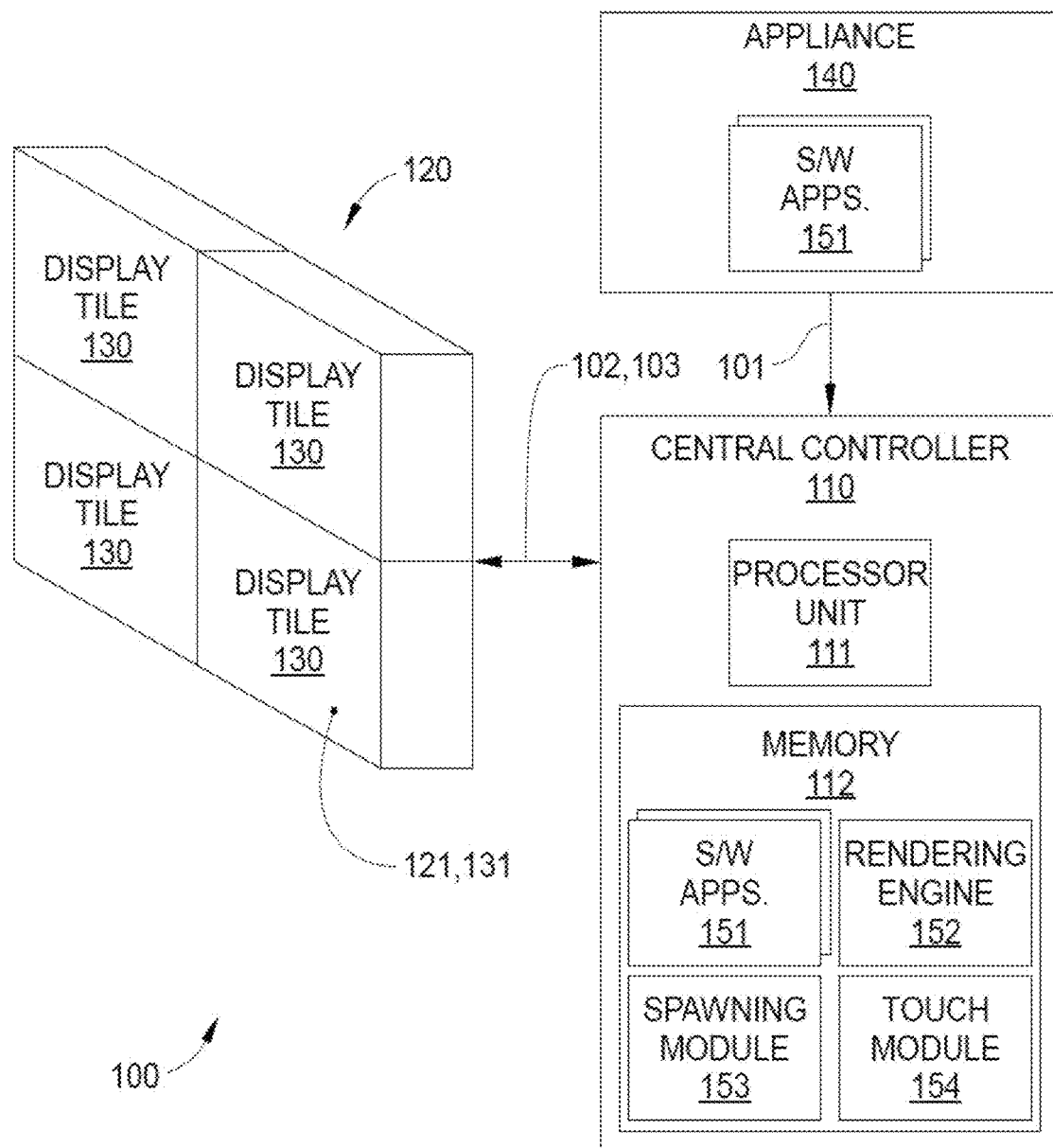
FIG. 1 is a block diagram of a display system configured to implement one or more aspects of the present invention.

FIG. 1 is a block diagram of a display system 100 configured to implement one or more aspects of the present invention. As shown, display system 100 includes, without limitation, a central controller 110, a display 120, and an appliance 140. In some embodiments, display 120 is a display wall that includes multiple display tiles. Central controller 110 receives digital image content 101 from the appliance 140 or from an information network or other data routing device, and converts said input into image data signals 102. Thus, digital image content 101 may be generated locally, with appliance 140, or from some other location. For example, when display system 100 is used for remote conferencing, digital image content 101 may be received via any technically feasible communications or information network, wired or wireless, that allows data exchange, such as a wide area network (WAN), a local area network (LAN), a wireless (Wi-Fi) network, and/or the Internet, among others.

Central controller 110 includes a processor unit 111 and memory 112. Processor unit 111 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processor unit 111 may be any technically feasible hardware unit capable of processing data and/or executing program code and software applications to facilitate operation of display system 100, including software applications 151, rendering engine 152, spawning module 153, and touch module 154. The processor unit 111 executes software and performs the functions and operations described herein. During operation, software applications 151, rendering engine 152, spawning module 153, and touch module 154 may reside in memory 112. Alternatively or additionally, software applications 151 may also reside in appliance 140. In some embodiments, one or more of 151-154 may be implemented in firmware, either in central controller 110 and/or in other components of display system 100.

Memory 112 may include volatile memory, such as a random access memory (RAM) module, and non-volatile memory, such as a flash memory unit, a read-only memory (ROM), or a magnetic or optical disk drive, or any other type of memory unit or combination thereof. Memory 112 is configured to store any software programs, operating system, drivers, and the like, that facilitate operation of display system 100, including software applications 151, rendering engine 152, spawning module 153, and touch module 154.

Display 120 may include the display surface or surfaces of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo 3D display all arranged as a single stand-alone display, head mounted display or as a single or multi-screen tiled array of displays. Display sizes may range from smaller handheld or head mounted display devices to full wall displays. In the example illustrated in FIG. 1, display 120 includes a plurality of display light engine and screen tiles 130 mounted in a 2×2 array. Other configurations and array dimensions of multiple electronic display devices, e.g. 1×4, 2×3, 5×6, etc., also fall within the scope of the present invention.

In operation, display 120 displays image data signals 102 output from controller 110. For a tiled display, as illustrated in FIG. 1, image data signals 102 are appropriately distributed among display tiles 130 such that a coherent image is displayed on a display surface 121 of display 120. Display surface 121 typically includes the combined display surfaces of display tiles 130. In addition, display 120 includes a touch-sensitive surface 131 that extends across part or all surface area of display tiles 130. In one embodiment, touch-sensitive surface 131 senses touch by detecting interference between a user and one or more beams of light, including, e.g., infrared laser beams. In other embodiments, touch sensitive surface 131 may rely on capacitive touch techniques, including surface capacitance, projected capacitance, or mutual capacitance, as well as optical techniques, acoustic wave-based touch detection, resistive touch approaches, and so forth, without limitation. Touch-sensitive surface 131 enables users to interact with assets displayed on the wall implementing touch gestures including tapping, dragging, swiping, and pinching. These touch gestures may replace or supplement the use of typical peripheral I/O devices, although touch-sensitive surface 131 may receive inputs from such devices, as well. In this regard, the display system 100 may also include typical peripheral I/O devices (not shown), such as an external keyboard or mouse.

In the context of this disclosure, an "asset" may refer to any interactive renderable content that can be displayed on a display, such as display 120, among others. Interactive renderable content is generally derived from one or more persistent or non-persistent content streams that include sequential frames of video data, corresponding audio data, metadata, flowable/reflowable unstructured content, and potentially other types of data. Generally, an asset may be displayed within a dynamically adjustable presentation window. For simplicity, an asset and corresponding dynamically adjustable presentation window are generally referred to herein as a single entity, i.e., an "asset." Assets may comprise content sources that are file-based, web-based, or Live Source. Assets may include images, videos, web browsers, documents, renderings of laptop screens, presentation slides, any other graphical user interface (GUI) of a software application, and the like. An asset generally includes at least one display output generated by a software application, such as a GUI of the software application. In one embodiment, the display output is a portion of a content stream. In addition, an asset is generally configured to receive one or more software application inputs via a gesture-sensitive display surface of a collaboration client system 140, i.e., inputs received via the gesture-sensitive display surface are received by the asset and treated as input for the software application associated with the asset. Thus, unlike a fixed image, an asset is a dynamic element that enables interaction with the software application associated with the asset, for example, for manipulation of the asset. For example, an asset may include select buttons, pull-down menus, control sliders, etc. that are associated with the software application and can provide inputs to the software application.

As also referred to herein, a "shared workspace" is a virtual digital canvas on which assets associated therewith, and their corresponding content streams, are displayed within a suitable dynamic "viewport window" on display 120. Thus, a shared workspace may comprise one or more associated assets (each asset displayed within a presentation window), whereby the entire shared workspace is displayed within a dynamically adjustable viewport window. A shared workspace may be displayed in the entire potential render area/space of the display 120, so that only a single shared workspace can be displayed on the surface thereof. In this case, the area of the viewport window that displays the shared workspace comprises the entire render area of the display 120. In other embodiments, however, the shared workspace and the viewport window may be displayed in a sub-area of the total display area of the display 120 that does not comprise the entire render area of the display 120. For example, multiple shared workspaces may be displayed in multiple viewport windows on the display 120 concurrently, whereby each shared workspace and viewport window does not correspond to the entire display surface. Each asset associated with a shared workspace, and content stream(s) corresponding to the asset, are displayed in a presentation window according to defined dimensions (height and width) and a location within the shared workspace and viewport window. The asset and presentation window dimensions and location may also be user-adjustable. As also referred to herein, a "project" may comprise a set of one or more related shared workspaces.

Touch-sensitive surface 131 may be a "multi-touch" surface, which can recognize more than one point of contact on display 120, enabling the recognition of complex gestures, such as two or three-finger swipes, pinch gestures, and rotation gestures as well as multiuser two, four, six etc. hands touch or gestures. Thus, one or more users may interact with assets on display 120 implementing touch gestures such as dragging to reposition assets on the screen, tapping assets to display menu options, swiping to page through assets, or implementing pinch gestures to resize assets. Multiple users may also interact with assets on the screen simultaneously. Again, examples of assets include application environments, images, videos, web browsers, documents, mirroring or renderings of laptop screens, presentation slides, content streams, and so forth. Touch signals 103 are sent from a touch panel associated with a display 120 to central controller 110 for processing and interpretation.

It will be appreciated that the system shown herein is illustrative only and that variations and modifications are possible. For example, any of software applications 151, rendering engine 152, spawning module 153, and touch module 154 may reside outside of central controller 110.

Figure 2:
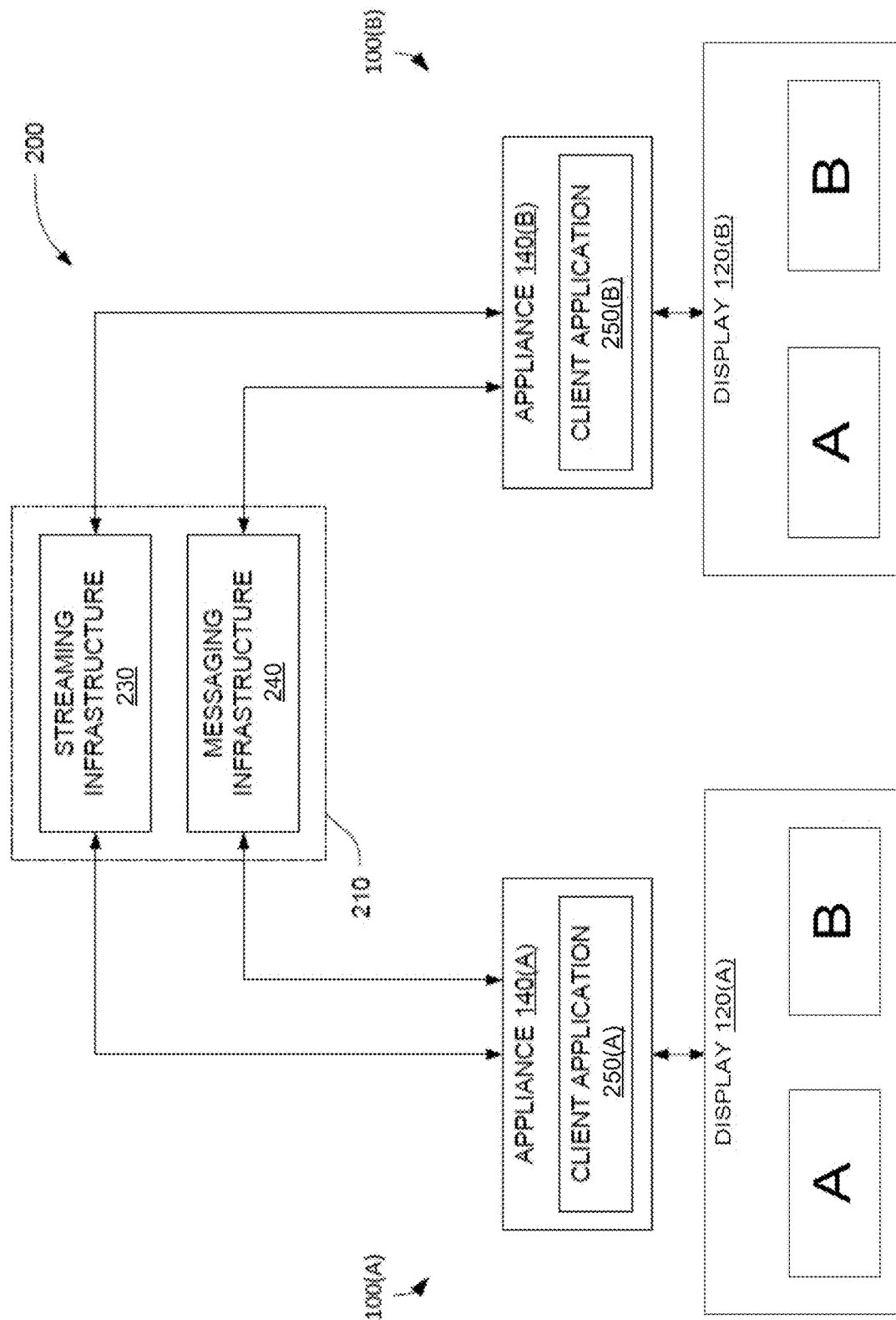
FIG. 2 is a conceptual diagram of a collaboration system configured to share content streams across display systems, according to various embodiments of the present invention.

FIG. 2 is a conceptual diagram of a collaboration system 200 configured to share content streams across display systems, according to various embodiments of the present invention. As shown, collaboration system 200 includes, without limitation, display systems 100A and 100B coupled together via a communication infrastructure 210. As shown in FIG. 2, the communication infrastructure 210 includes streaming infrastructure 230 and messaging infrastructure 240. Additionally, display system 100A is shown to include appliance 140A as well as display 120A, and display system 100B is shown to include appliance 140B as well as display 120B. For illustrative purposes, the appliances 140A and 140B each include a central controller 110 (not shown). In one embodiment, each of displays 120A and/or 120B represents a different instance of display 120 of FIG. 1 Appliance devices 140A and 140B include client applications 250A and 250B, respectively.

Display system 100A is configured to share a content stream A, via communication infrastructure 210, with display system 100B. In response, display system 100B is configured to retrieve content stream A from communication infrastructure 210 and to display that content stream on display 120B with its content stream B. Likewise, display system 100B is configured to share content stream B, via communication infrastructure 210, with display system 100A. In response, display system 100A is configured to retrieve content stream B from communication infrastructure 210 and to display that content stream on display 120A with its content stream A. In this fashion, display systems 100A and 100B are configured to coordinate with one another to generate a shared workspace that includes content streams A and B. Content streams A and B may be used to generate different assets rendered within the shared workspace. In one embodiment, each of display systems 100A and 100B perform a similar process to reconstruct the shared workspace, thereby generating a local version of that shared workspace that is similar to other local versions of the shared workspace reconstructed at other display systems. As a general matter, the functionality of display systems 100A and 100B are coordinated by client applications 250A and 250B, respectively.

Client applications 250A and 250B are software programs that generally reside within a memory (not shown) associated with the respective appliances 140A and 140B. Client applications 250A and 250B may be executed by a processor unit (not shown) included within the respective computing appliances 140. When executed, client applications 250A and 250B setup and manage the shared workspace discussed above in conjunction with FIG. 2, which, again, includes content streams A and B. In one embodiment, the shared workspace is defined by metadata that is accessible by both display systems 100A and 100B. Each such display system 100 may generate a local version of the shared workspace that is substantially synchronized with the other local version, based on that metadata (discussed below in relation to FIG. 3).

In doing so, client application 250A is configured to transmit content stream A to streaming infrastructure 230 for subsequent streaming to display system 100B. Client application 250A also transmits a message to display system 100B, via messaging infrastructure 240, that indicates to display system 100B that content stream A is available and can be accessed at a location reflected in the message. In like fashion, client application 250B is configured to transmit content stream B to streaming infrastructure 230 for subsequent streaming to display system 100A. Client application 250B also transmits a message to display system 100A, via messaging infrastructure 240, that indicates to display system 100A that content stream B is available and can be accessed at a location reflected in the message. The message indicates that access may occur from a location within streaming infrastructure 230.

Client application 250A may also broadcast a message via messaging infrastructure 240 to display system 100B that includes specifies various attributes associated with content stream A that may be used to display content stream A. The attributes may include a location/position, a picture size, an aspect ratio, or a resolution with which to display content stream A on display 120B, among others, and may be included within metadata described below in relation to FIG. 3. Client application 250B may extract the attributes from messaging infrastructure 240, and then display content stream A at a particular position on display 120B, with a specific picture size, aspect ratio, and resolution, as provided by messaging infrastructure 240. Through this technique, display system 100A is capable of sharing content stream A with display system 100B. Display system 100B is configured to perform a complimentary technique in order to share content stream B with display system 100A.

Client applications 250A and 250B are thus configured to perform similar techniques in order to share content streams A and B, respectively with one another. When client application 250A renders content stream A on display 120A and, also, streams content stream B from streaming infrastructure 230, display system 100A thus constructs a version of a shared workspace that includes content streams A and B.

Similarly, when client application 250B renders content stream B on display 120B and, also streams content stream A from streaming infrastructure 230, display system 100A similarly constructs a version of that shared workspace that includes content streams A and B.

The display systems 100A and 100B discussed herein are generally coupled together via streaming infrastructure 230 and messaging infrastructure 240. Each of these different infrastructures may include hardware that is cloud-based and/or collocated on-premises with the various display systems. However, persons skilled in the art will recognize that a wide variety of different approaches may be implemented to stream content streams and transport messages/messages between display systems.

Figure 3:
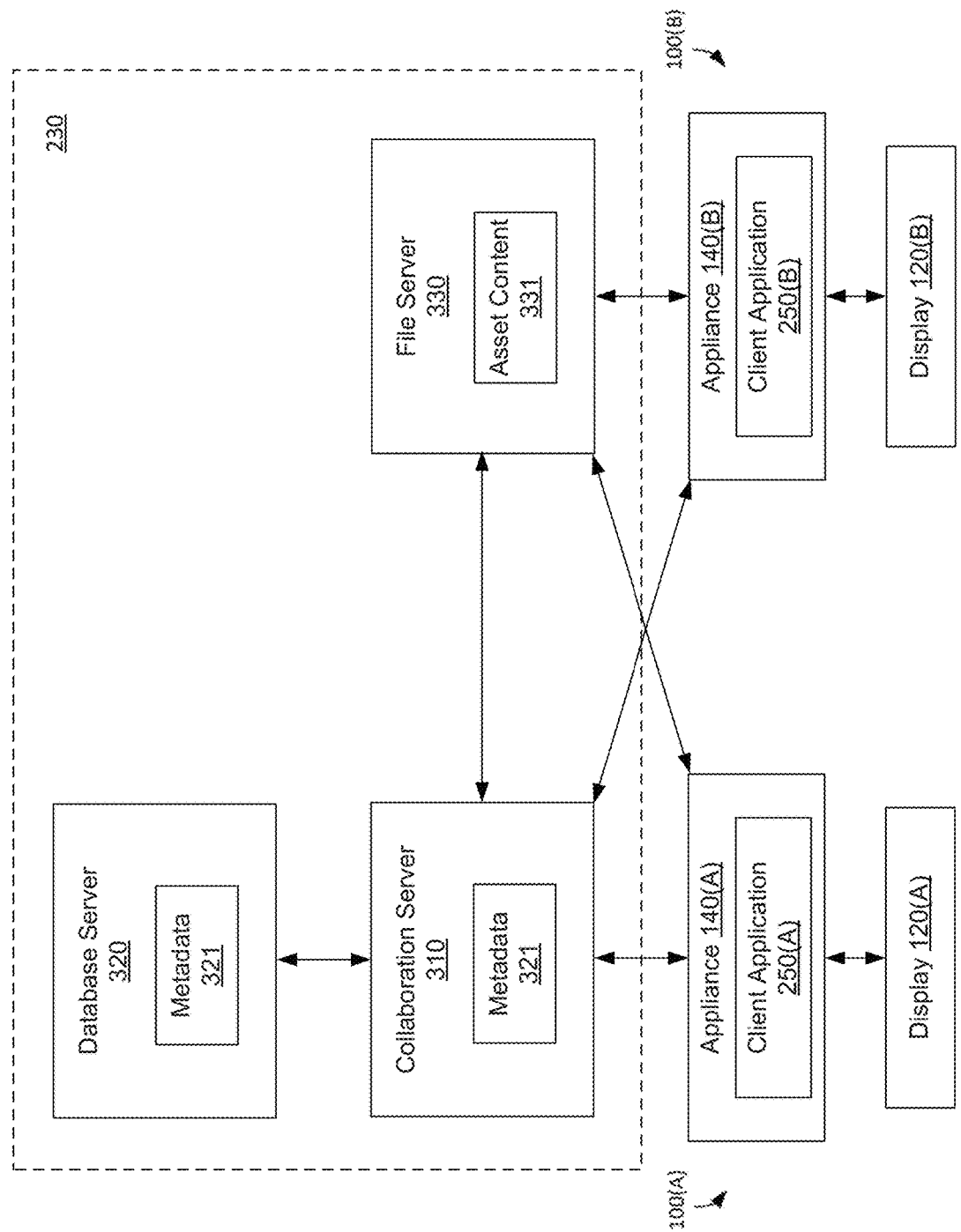
FIG. 3 is a more detailed block diagram of the streaming infrastructure of FIG. 2, according to various embodiments of the present invention.

FIG. 3 is a more detailed block diagram of the streaming infrastructure of FIG. 2, according to various embodiments of the present invention. Streaming infrastructure 230 may include a collaboration server 310, a database server 320, and a file server 330. Each server may comprise a computer device having a processor (such as processor unit 111 described in relation to FIG. 1) and a memory (such as memory 112 described in relation to FIG. 1), the processor executing software for performing functions and operations described herein. Collaboration server 310, database server 320, and file server 330 may be implemented as shown as separate and distinct computing devices/structures coupled to each other and to appliance systems 140 via a network. Alternatively, the functionality of collaboration server 310, database server 320, and file server 330 may be implemented as a single computing device/structure in a single location, or in any other technically feasible combination of structures. Further, one or more of collaboration server 310, database server 320, and/or file server 330 may be implemented as a distributed computing system. The network may be via any technically feasible communications or information network, wired or wireless, that allows data exchange, such as a wide area network (WAN), a local area network (LAN), a wireless (WiFi) network, and/or the Internet, among others.

Collaboration server 310 coordinates the flow of information between the various appliances 140, database server 320, and file server 330. Thus, in some embodiments, collaboration server 310 is a streaming server for appliances 140. In some embodiments, the application program interface (API) endpoint for appliances 140 and/or business logic associated with streaming infrastructure 230 resides in collaboration server 310. In addition, collaboration server 310 receives requests from appliances 140 and can send notifications to appliances 140. Therefore, there is generally a two-way connection between collaboration server 310 and each of appliances 140. Alternatively or additionally, appliances 140 may make requests on collaboration server 310 through the API. For example, during collaborative work on a particular project via collaboration system 200, a collaboration appliance 140 may send a request to collaboration server 310 for information associated with an asset to display the asset in a shared workspace of the particular project.

Database server 320 (as well as collaboration server 310) may store metadata 321 associated with collaboration system 200, such as metadata for specific assets, shared workspaces, and/or projects. For example, such metadata may include which assets are associated with a particular shared workspace, which shared workspaces are associated with a particular project, the state of various settings for each shared workspace, annotations made to specific assets, etc. Metadata 321 may also include aspect ratio metadata and asset metadata for each asset. In some embodiments, aspect ratio metadata may include an aspect ratio assigned to the project (referred to herein as the "assigned aspect ratio"). An aspect ratio assigned to a project applies to the shared workspaces of the project so that all shared workspaces of the project have the same aspect ratio assigned to the project. Asset metadata for an asset may specify a location/position and dimensions/size of the asset within an associated shared workspace.

The asset metadata indicates the position and size of an asset, for example, implementing horizontal and vertical (x and y) coordinate values. In some embodiments, the asset metadata may express the position and size of an asset in percentage values. In such embodiments, the size (width and height) and position (x, y) of the asset is represented in terms of percent locations along an x-axis (horizontal axis) and y-axis (vertical axis) of the associated shared workspace. For example, the position and size of an asset may be expressed as percentages of the shared workspace width and shared workspace height. The horizontal and vertical (x and y) coordinate values may correspond to a predetermined point on the asset, such as the position of the upper left corner of the asset. Thus, when display surfaces of appliances 140 have different sizes and/or aspect ratios, each asset can still be positioned and sized proportional to the specific shared workspace in which is it being displayed. When multiple display systems 100 separately display a shared workspace, each display system 100 may configure the local version of the shared workspace based on the received metadata.

File server 330 is the physical storage location for some or all asset content 331 that are rendered as files, such as documents, images, and videos. In some embodiments, file server 330 can receive requests for asset content 331 directly from appliances 140. For example, an asset, such as a word-processing document, may be associated with a shared workspace that is displayed on the display 120 of first and second appliances 140. When the asset is modified by a user at the first collaboration appliance 140A, metadata for a file associated with the asset is updated in file server 330 by collaboration server 310, the second collaboration appliance 140B downloads the updated metadata for the file from file server 330, and the asset is then displayed, as updated, on the gesture-sensitive display surface of the second collaboration appliance 140B. Thus, file copies of all assets for a particular shared workspace and project may be stored at the file server 330, as well as stored at each appliance 140 that is collaborating on a project.

Each of appliances 140 is an instance of a collaborative multi-media platform disposed at a different location in collaboration system 200. Each collaboration appliance 140 is configured to provide a digital system that can be mirrored at one or more additional and remotely located appliances 140. Thus, collaboration clients facilitate the collaborative modification of assets, shared workspaces, and/or complete presentations or other projects, as well as the presentation thereof.

Figure 4:
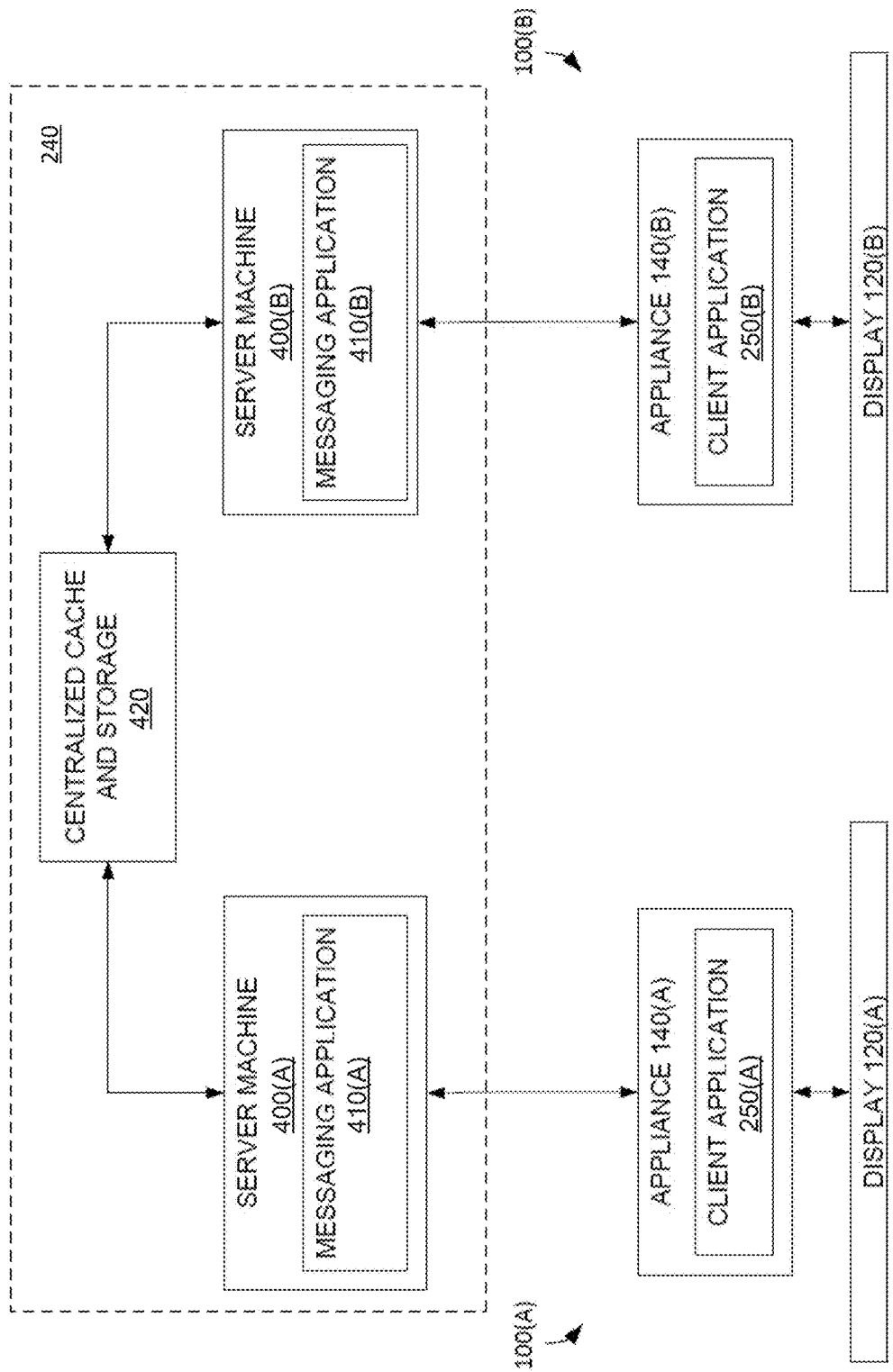
FIG. 4 is a more detailed block diagram of the messaging infrastructure of FIG. 2, according to one embodiment of the present invention.

FIG. 4 is a more detailed block diagram of the messaging infrastructure of FIG. 2, according to one embodiment of the present invention. As shown, messaging infrastructure 240 includes server machines 400A and 400B coupled together via centralized cache and storage 420. Server machine 400A is coupled to appliance 140A and includes a messaging application 410A. Server machine 400B is coupled to appliance 140B and includes a messaging application 410B.

Server machines 400A and 400B are generally cloud-based or on-premises computing devices that include memory (such as memory 112 described in relation to FIG. 1) and processor units (such as processor unit 111 described in relation to FIG. 1) configured to store and execute messaging applications 410A and 410B, respectively. Messaging applications 410A and 410B are configured to generate real-time socket connections with appliances 140A and 140B, respectively, to allow messages to be transported quickly between the appliances 140. In one embodiment, messaging applications 410A and 410B are implemented as ASP.NET applications and rely on signalR WebSockets to accomplish fast, real-time messaging.

Centralized cache and storage 420 provide a persistent messaging back-end through which messages can be exchanged between messaging applications 410A and 410B. In one embodiment, centralized cache and storage includes a Redis cache backed by a SQL database. Messaging applications 410A and 410B may be configured to periodically poll centralized cache and storage 420 for new messages, thereby allowing messages to be delivered to those applications quickly.

In operation, when display system 100A transmits a message indicating that content stream A is available on streaming infrastructure 510, as described above, display system 100A transmits that message to messaging application 410A. Messaging application 410A may then relay the message to centralized cache and storage 420. Messaging application 410B polls centralized cache and storage 420 periodically, and may thus determine that that the message has arrived. Messaging application 410B then relays the message to display system 1006. Display system 1006 may then parse the message to retrieve an identifier associated with display system 100A, and then stream content associated with display system 100A from streaming server 610.

Preview Feature

Figure 5:
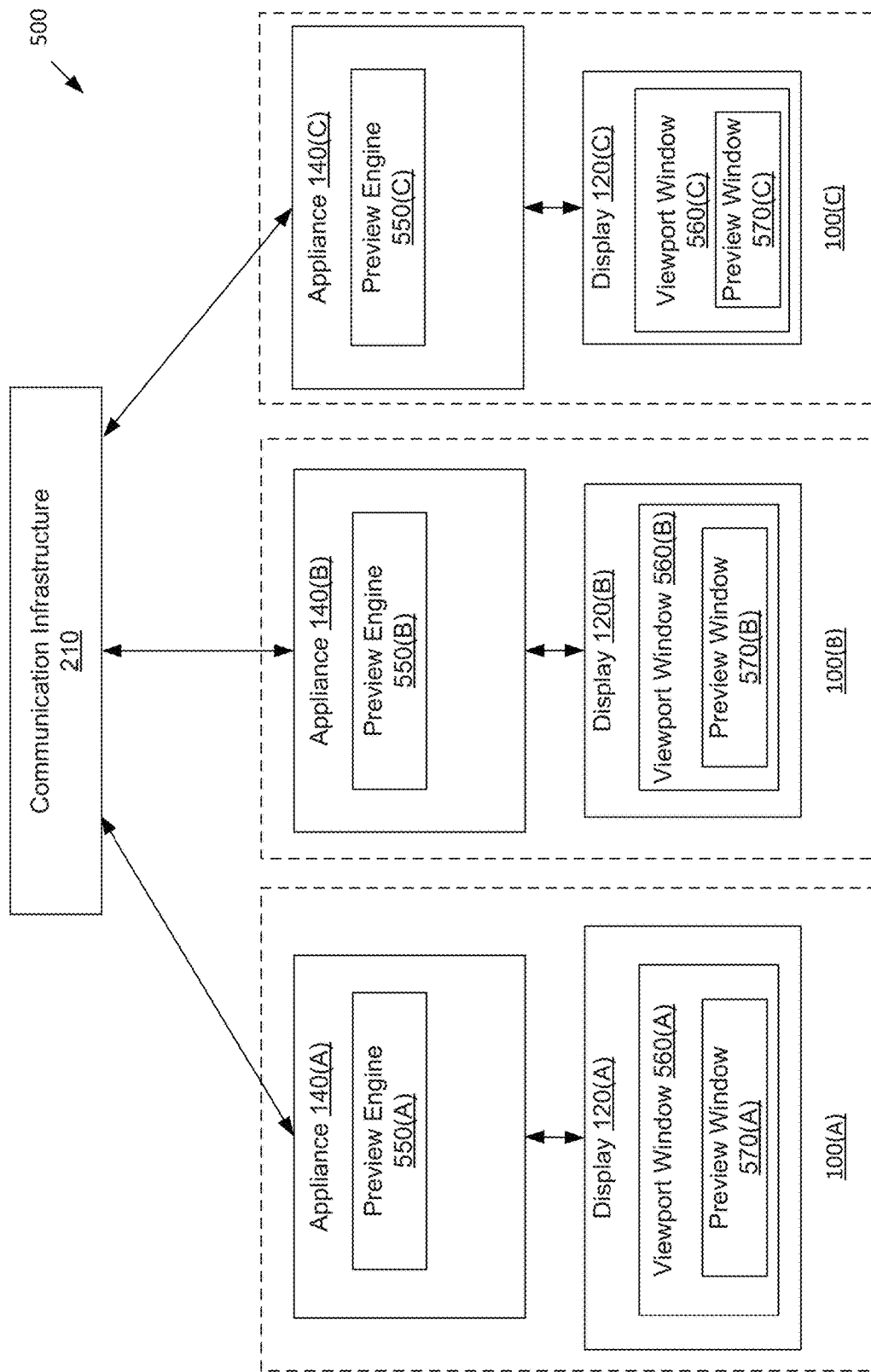
FIG. 5 is a conceptual diagram of a collaboration system configured to share a shared workspace implementing a preview feature, according to various embodiments of the present invention.

FIG. 5 is a conceptual diagram of a collaboration system 500 configured to share a shared workspace implementing a preview feature, according to various embodiments of the present invention. As shown, collaboration system 500 includes, without limitation, a communication infrastructure 210 connected with one or more display systems 100 (such as 100A, 1006, and 100C), each display system 100 comprising an appliance 140 (such as 140A, 140B, and 140C, respectively) and a display 120 (such as 120A, 120B, and 120C, respectively). Each appliance 140 comprises a client computing device that includes a central controller 110 (not shown) that executes a preview engine 550. Preview engine 550 comprises a software program that generally reside within a memory (not shown) and is executed by a processor unit (not shown) included within the appliance 140. When executed, preview engine 550 performs a preview technique for displaying and panning a shared workspace. As used herein, an appliance 140 may be referred to as a client device and these terms may be used interchangeably. For example, an appliance 140 may comprise a workstation, a laptop computer, a tablet, cell phone or other hand-held device, or any other type of computing device.

The collaboration system 500 of FIG. 5 may share a shared workspace with display systems 100 and appliances 140 having displays 120 with various aspect ratios. As shown, a first appliance 140A comprises a first display 120A having a first aspect ratio, a second appliance 140B comprises a second display 120B having a second aspect ratio, and a third appliance 140C comprises a third display 120C having a third aspect ratio. In the example of FIG. 5, relative to the first, second, and third aspect ratios, the first aspect ratio is the largest aspect ratio, the second aspect ratio is the second largest aspect ratio, and the third aspect ratio is the smallest aspect ratio. As discussed above, a project has an assigned aspect ratio stored as aspect ratio metadata 321 on the database server 320 and/or collaboration server 310. An aspect ratio assigned to a project applies to the shared workspaces of the project so that all shared workspaces of the project have the same aspect ratio assigned to the project. In the example of FIG. 5, the first aspect ratio is equal to or greater than the assigned aspect ratio, the second aspect ratio is lower than the assigned aspect ratio, and the third aspect ratio is also is lower than the assigned aspect ratio of the shared workspace. In some embodiments, an assigned aspect ratio is a fixed property on a project that may be modified by a user. The modified assigned aspect ratio is persistent and may cause asset content to be reformatted to fit within the new aspect ratio. For example, in the case where the modified assigned aspect ratio causes a decrease in the width property, asset content x-values may be positioned proportionately into the new aspect ratio (scaled). In the case where the modified assigned aspect ratio causes an increase of the width property, the workspace may be extended to the right with empty space and all asset content left unchanged.

Each appliance 140 displays the shared workspace in a viewport window 560 (such as 560A, 560B, and 560C) of the display 120. In the embodiments described below, the area of the viewport window 560 displaying the shared workspace comprises the entire display area of the display 120. As such, to perform the preview feature described herein, the dimensions and aspect ratio of the display may be used instead of the dimensions and aspect ratio of the viewport window 560 since these values are equal. In other embodiments, however, the viewport window 560 displaying the shared workspace may comprise a sub-area of the display 120 that does not comprise the entire/total display area of the display 120. In these embodiments, the viewport window 560 may comprise an adjustable size bounded window within the screen display 120, the viewport window 560 representing a dedicated space for rendering workspace data. Further, two or more viewport windows 560 may be simultaneously displayed in the same display 120 for displaying different and distinct shared workspaces. In this case, to perform the preview feature described herein, the dimensions and aspect ratio of the viewport window 560 is to be used in place of the aspect ratio of the display 120.

In some embodiments, the preview engine 550 of each appliance 140 causes the display 120 to display, in the viewport window 560, the shared workspace with the assigned aspect ratio, regardless of the aspect ratio of the display 120 itself. As referred to herein, the viewport window 560A displays a "standard" version of the shared workspace ("standard shared workspace"). For the first display 120A having a first aspect ratio that is equal to or greater than the assigned aspect ratio, the entire shared workspace may be displayed in the viewport window 560A at one time. For the second and third displays 120B and 120C having the second and third aspect ratios that are each less than the assigned aspect ratio, only a portion (sub-area) of the shared workspace can be displayed in the viewport window 560 at one time.

While displaying the entire shared workspace or a portion of the shared workspace in the viewport window 560, the preview engine 550 of each appliance 140 may also cause the display 120 to simultaneously display a "preview" version of the entire shared workspace ("preview shared workspace") in a preview window 570 (such as 570A, 570B, and 570C). The preview version of the entire shared workspace may comprise a thumbnail or miniature reduced-size version of the shared workspace relative to the standard version of the shared workspace displayed in the viewport window 560. The preview shared workspace displayed in the preview window 570 comprises a smaller display area that the display area of the standard shared workspace displayed in the viewport window 560. In some embodiments, the preview shared workspace displayed in the preview window 570 comprises less than 25% of the display area of the standard shared workspace displayed in the viewport window 560. In other embodiments, the preview shared workspace displayed in the preview window 570 comprises any other size. The preview window 570 may be displayed as an overlay on top of the viewport window 560 or as a separate window. The preview window 570 may also display a preview version of each shared workspace in the associated project.

Note that regardless of the aspect ratio of the display 120, a preview version displays the entire workspace in the preview window 570. Thus, even for the second and third displays 120B and 120C, where each has a second and a third aspect ratio, respectively, that is less than the assigned aspect ratio, each of the preview windows 570B and 570C displays a preview version of the entire workspace in the preview window 570. In contrast, the viewport windows 560B and 560C of the second and third displays 120B and 120C, respectively, each displays only a portion (sub-area) of the standard version of the workspace.

Each preview window 570 may comprise a user-interface (UI) control mechanism for enabling a user to pan to different portions of the shared workspace displayed in the viewport window 560. In this regard, the preview engine 550 of each appliance 140 may cause the display 120 to display a local viewport boundary in the preview window 570. In some embodiments, the preview window 570 is a feature provided in the context of multiple shared uses of the shared workspace wherein previews are simultaneously provided across a common collaboration of the shared workspace. The local viewport boundary may be displayed as an overlay on the preview shared workspace corresponding to the shared workspace being displayed in the viewport window 560. In the preview shared workspace, the local viewport boundary indicates a corresponding portion of the standard shared workspace currently displayed in the viewport window 560 of the local display 120. The local viewport boundary comprises an interactive navigation window that enables panning of the standard shared workspace in the viewport window 560. A user may select and move the local viewport boundary (e.g., by touching and dragging the local viewport boundary) across the preview shared workspace in the preview window 570, which then causes corresponding panning of the standard shared workspace displayed in the viewport window 560. Thus, each time the local viewport boundary is moved to a new portion of the preview shared workspace in the preview window 570, the corresponding portion of the standard shared workspace is then caused to be displayed in the viewport window 560. In some embodiments, in a constant aspect ratio mode panning is only allowed in the horizontal direction, wherein the vertical component is kept constant at the full vertical portion of the shared workspace.

In the embodiments described below, an aspect ratio is defined as the ratio of a width dimension to a height dimension. Thus, the assigned aspect ratio of the shared workspace comprises a ratio of the width to the height of the shared workspace, and the aspect ratio of the display 120 or viewport window 560 comprises a ratio of the width to the height of the display area of the display 120 or viewport window 560. In the case where the viewport window 560 comprises the entire display area of the display 120, the preview engine 550 uses the entire height of the display 120 to display the standard shared workspace while enforcing/applying the aspect ratio assigned to the shared workspace. Given that the height dimension (in pixels) of the standard shared workspace is set to equal the height dimension (in pixels) of the display 120, the preview engine 550 then applies the assigned aspect ratio to determine the width dimension (in pixels) of the standard shared workspace.

When opening a project and associated shared workspace (stored on the communication infrastructure 210), each preview engine 550 determines the pixel dimensions for rendering the standard shared workspace to be displayed in the viewport window 560 based on characteristics of its local display 120 (such as aspect ratio, height, and width).

The pixel dimensions of the shared workspace for a particular display 120 comprise local pixel dimensions that may be unique to the display system on which the shared workspace is being rendered and other display systems may calculate different local pixel dimensions based on the local display resolution. In some embodiments, the pixel dimensions of the shared workspace for a particular display 120 is defined by the below equations:

$$localprojectHeight = displayHeight \quad (1)$$

$$localprojectWidth = localprojectHeight * projectAspectRatio \quad (2)$$

In these equations, it is assumed that the viewport window 560 comprises the entire display area of the display 120 and the aspect ratio is defined as the ratio of width to height. In these formulas, the following values are used:

displayHeight=display height(in pixels);

displayWidth=display width(in pixels);

projectAspectRatio=aspect ratio assigned to the project and all shared workspaces;

localprojectHeight=shared workspace height(in pixels); and localprojectWidth=shared workspace width(in pixels).

Thus, for each display 120 having an aspect ratio (width/height) value that is equal to or greater than the assigned aspect ratio value, the width dimension (in pixels) of the display 120 would be equal to or greater than the determined width dimension (in pixels) of the standard shared workspace (since the height dimension is the same for the display 120 and the standard shared workspace). Therefore, this type of display 120 can display the entire standard shared workspace at one time and panning of the standard shared workspace would not be necessary or enabled.

For each display 120 having an aspect ratio (width/height) value that is less than the assigned aspect ratio value, the width dimension (in pixels) of the display 120 are less than the determined width dimension (in pixels) of the standard shared workspace (since the height dimension is the same for the display 120 and the standard shared workspace). This type of display 120 can only display a portion (sub-area) of the standard shared workspace and not the entire shared workspace at one time. In particular, the display 120 can display the entire height of the standard shared workspace but only a portion of the width of the standard shared workspace. A display 120 with a lower aspect ratio displays a smaller portion of the standard shared workspace at one time than a display 120 with a higher aspect ratio. For example, the third display 120C, having a smaller aspect ratio than the second display 120B, displays a smaller portion of the width of the standard shared workspace than the second display 120B at one time. Thus, for this type of display 120, horizontal (left and right) panning of the standard shared workspace implementing the preview window 570 would be enabled. In general, where the aspect ratio is defined as the ratio of width to height, the preview window 570 may comprise a user-interface (UI) control for enabling a user to pan horizontally (left and right) to different portions of the standard shared workspace displayed in the viewport window 560.

In other embodiments, the preview window 570 may comprise a user-interface (UI) control for enabling a user to pan vertically (up and down) to different portions of the standard shared workspace displayed in the viewport window 560. In these embodiments, the aspect ratio is defined as the ratio of height to width. Similar techniques described herein may be applied to provide vertical panning by switching the height and width dimensions in the operations and calculations described herein. For example, the preview engine 550 may set the width dimension (in pixels) of the standard shared workspace to equal the width dimension (in pixels) of the display 120 and apply the assigned aspect ratio (height/width) to determine the height dimension (in pixels) of the standard shared workspace. For each display 120 having an aspect ratio (height/width) that is equal to or greater than the assigned aspect ratio value, the height dimension (in pixels) of the display 120 would be equal to or greater than the determined height dimension (in pixels) of the standard shared workspace and panning of the standard shared workspace would not be necessary. For each display 120 having an aspect ratio (height/width) that is less than the assigned aspect ratio value, the height dimension (in pixels) of the display 120 is less than the determined height dimension (in pixels) of the standard shared workspace and the display 120 can display only a portion (sub-area) of the standard shared workspace at one time. Thus, for this display 120, vertical (up and down) panning of the standard shared workspace implementing the preview window 570 would be enabled.

In other embodiments, the viewport window 560 does not comprise the entire display area of the display 120 and comprises a sub-area of the entire display area of the display 120. In this case, similar techniques described herein may be applied to by using the characteristics of the client viewport window 560 in place of the characteristics of the client display 120. In particular, the width and height dimensions and the aspect ratio of the viewport window 560 may be used in place of the width and height dimensions and the aspect ratio of the display 120 in the operations and calculations described herein. For example, to display the standard shared workspace, the preview engine 550 may set the height dimension (in pixels) of the standard shared workspace to equal the height dimension (in pixels) of the viewport window 560 and apply the assigned aspect ratio to determine the width dimension (in pixels) of the standard shared workspace. For a viewport window 560 having an aspect ratio value that is equal to or greater than the assigned aspect ratio value, the width dimension of the viewport window 560 would be equal to or greater than the determined width dimension of the standard shared workspace and thus panning of the standard shared workspace would not be necessary or enabled. For a viewport window 560 having an aspect ratio value that is less than the assigned aspect ratio value, the width dimension of the display 120 is less than the determined width dimension of the standard shared workspace and the viewport window 560 can display only a portion (sub-area) of the standard shared workspace at one time. Thus, for this viewport window 560, panning of the standard shared workspace implementing the preview window 570 would be enabled.

In additional embodiments, when multiple users/appliances 140 are sharing the same shared workspace, the preview engine 550 of at least one appliance 140 may cause the display 120 to display, in the viewport window 560, one or more remote viewport boundaries corresponding to one or more remote users/appliances 140. Each remote viewport boundary may be displayed as an overlay on top of a portion of the viewport window 560, the remote viewport boundary indicating a portion of the standard shared workspace that is currently displayed in the viewport window 560 of a display 120 of a particular remote user/appliance 140 that is sharing the same shared workspace. Note that local viewport boundary is displayed in the preview window 570 of the local display and indicates the portion of the shared workspace currently displayed in the viewport window 560 of the local display 120, whereas the remote viewport boundary is displayed in the viewport window 560 of the local display and indicates the portion of the shared workspace currently displayed in the viewport window 560 of a remote display 120 of a remote user/appliance 140. Each remote viewport boundary may have a different visual appearance for each different remote user/appliance 140.

The preview engine 550 of an appliance 140 may operate in conjunction with other preview engines 550 of other appliances 140 and the communication infrastructure 210 to enable the functions and operations of the preview feature described herein. For example, an appliance 140 may send a request to the streaming infrastructure 230 to open a project (having a particular project name). In response, the various servers of the streaming infrastructure 230 (such as collaboration server 310, database server 320, and file server 330) may work in conjunction to return all necessary information regarding the project ("project information") to the appliance 140. As discussed above, each project may comprise a project name, an assigned aspect ratio, one or more shared workspaces, and one or more assets for each shared workspace. Therefore, the returned project information may include files for the asset content (such as documents, images, and videos) of all assets associated with the project. The project information may also include metadata, such as metadata identifying the shared workspaces associated with the requested project, metadata identifying which assets are associated with a particular shared workspace, aspect ratio metadata specifying an assigned aspect ratio for the project, and/or asset metadata specifying the location/position and dimensions/size of each asset within a particular shared workspace. Each appliance 140 that requests and receives the project information may then store the project information to local memory or local storage. The preview engine 550 of each appliance 140 may then separately display a shared workspace by configuring a local version of the shared workspace based on the received metadata by implementing techniques described herein to enable the preview feature.

Further, each appliance 140 may send messages to other appliances 140 that are sharing the same project via the messaging infrastructure 240. For example, an appliance 140 may send a message indicating the portion of the shared workspace that is currently displayed in its viewport window 560 to the other appliances 140 (via the messaging infrastructure 240) whenever the portion of the shared workspace that is currently displayed in its viewport window 560 is changed. The preview engine 550 of each appliance 140 receiving this message may then update the position of the remote viewport boundary (that corresponds to the particular appliance 140 sending the message) accordingly to indicate the portion of the shared workspace currently displayed by the particular remote appliance 140.

Figure 6:
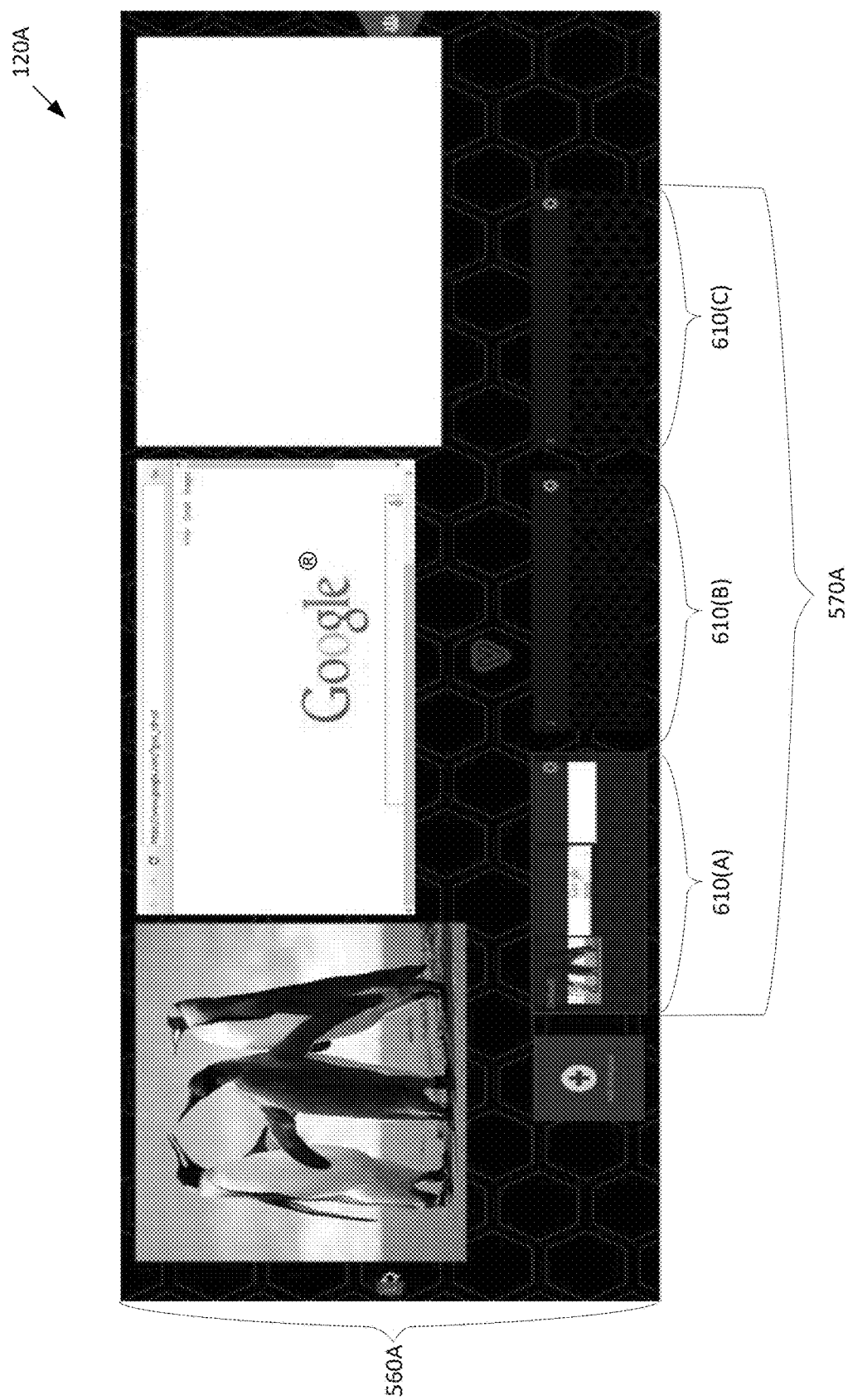
FIG. 6 is a screenshot of the preview feature of FIG. 5 implemented on a display having a large aspect ratio, according to various embodiments of the present invention.

FIG. 6 is a screenshot of the preview feature of FIG. 5 implemented on a display having a large aspect ratio, according to various embodiments of the present invention. The large aspect ratio display 120A may comprise the display of the first appliance 140A and first display system 100A shown in FIG. 5. The preview engine 550A of the first appliance 140A may configure and display the exemplary screenshot of FIG. 6.

In the example of FIG. 6, the viewport window 560A of the display 120A comprises the entire display area of the display 120A and displays a first shared workspace for a project. The display 120A has an aspect ratio that is equal to or greater than the assigned aspect ratio of the project and shared workspace. As such, the viewport window 560A displays the entire first shared workspace at one time and panning of the shared workspace would not be necessary. While displaying the shared workspace in the viewport window 560A, a preview window 570A is also displayed on the display 120A. In the example of FIG. 6, the preview window 570A is displayed as an overlay on top of the viewport window 560A, but in other embodiments, the preview window 570A may be displayed as a separate window.

The preview window 570A may display a preview shared workspace 610 (preview version) of each shared workspace in the associated project (such as 610A, 610B, and 610C). For example, a first preview shared workspace 610A is displayed in the preview window 570 for the first shared workspace of the project (which is also currently displayed in the viewport window 560A). Note that regardless of the aspect ratio of the display 120A, the preview window 570B displays a preview version 610 of the entire shared workspace for each shared workspace in the project. Each preview version 610 of the shared workspace may comprise a thumbnail or miniature reduced-size version of the shared workspace relative to the standard version of the shared workspace displayed in the viewport window 560.

The preview window 570A may comprise a user-interface (UI) control for enabling a user to select between different shared workspaces of the project. A user may select a shared workspace by, e.g., clicking on or touching the preview shared workspace 610 corresponding to the desired shared workspace. For example, the user may select a second preview shared workspace 610B corresponding to a second shared workspace by clicking on (via a mouse) or touching (via a touchscreen) the second preview shared workspace 610B. In response, the preview engine 550A may then display a standard version of the second shared workspace in the viewport window 560A.

Figure 7A:
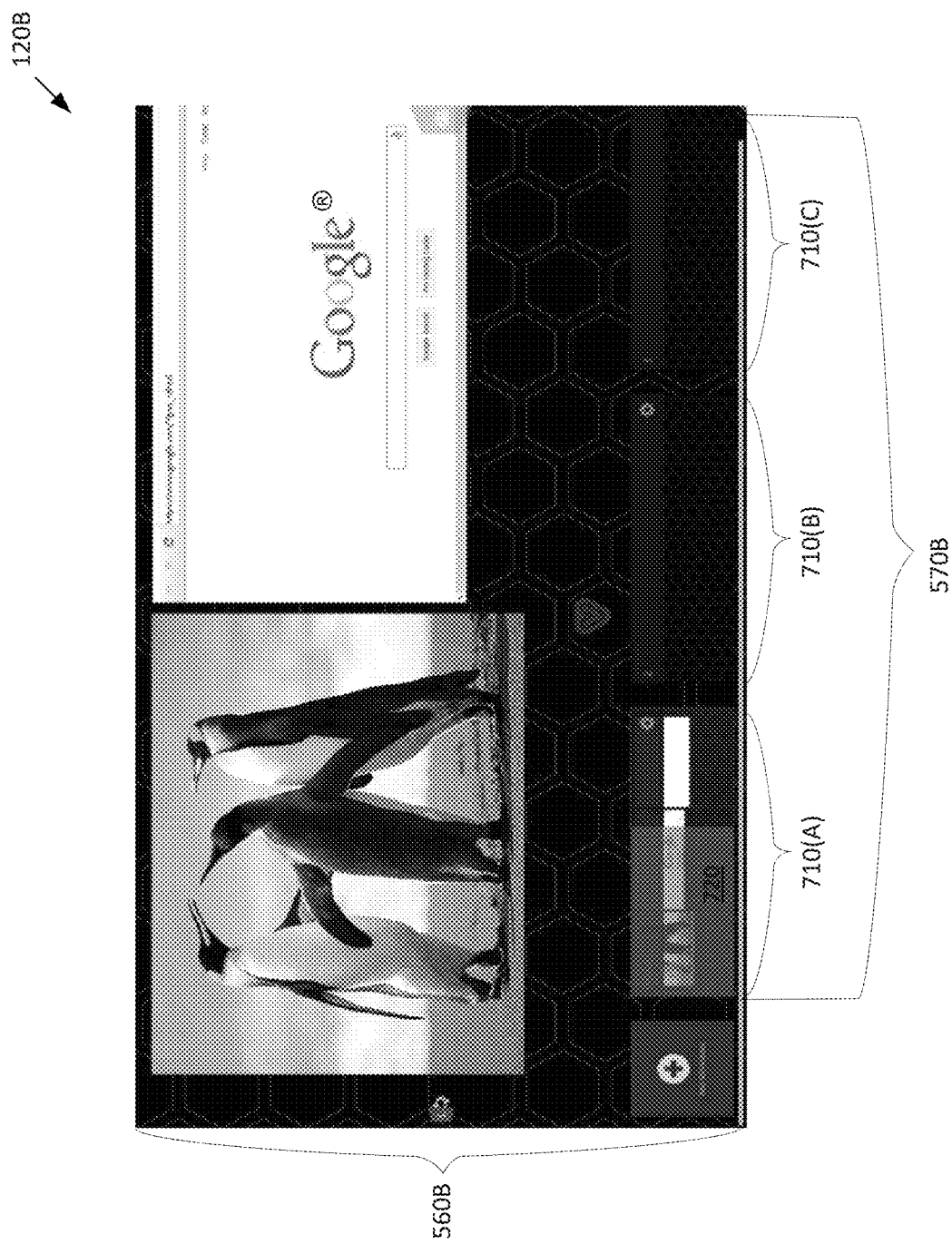
FIG. 7A is a screenshot of the preview feature of FIG. 5 implemented on a display having a small aspect ratio, according to various embodiments of the present invention.

FIG. 7A is a screenshot of the preview feature of FIG. 5 implemented on a display having a small aspect ratio, according to various embodiments of the present invention. The small aspect ratio display 120B may comprise the display of the second appliance 140B and second display system 100B shown in FIG. 5. The preview engine 550B of the second display system 1006 may configure and display the exemplary screenshot of FIG. 7A.

In the example of FIG. 7A, the viewport window 560B of the display 1206 comprises the entire display area of the display 1206 and displays a first shared workspace for a project. The project and shared workspaces shown in FIG.

7A may be the same as the project and shared workspaces shown in FIG. 6. The display 1206 has an aspect ratio that is less than the assigned aspect ratio of the project and shared workspace. As such, the viewport window 560B displays only a portion (sub-area) of the first shared workspace at one time. In particular, the viewport window 560B may display the entire height of the first shared workspace, but only a portion of the entire width of the first shared workspace. Thus, a panning feature may be enabled to provide horizontal panning of the width of the first shared workspace in the viewport window 560B.

While displaying the shared workspace in the viewport window 560B, a preview window 570B is also displayed on the display 120B (e.g., as an overlay on the viewport window 560B). The preview window 570B may display a preview shared workspace 710 (preview version) of each shared workspace in the associated project (such as 710A, 710B, and 710C). For example, a first preview shared workspace 710A is displayed in the preview window 570B for the first shared workspace of the project (which is also currently displayed in the viewport window 560B). Note that even though the aspect ratio of the display 1206 is less than the assigned aspect ratio of the shared workspace, the preview window 570B displays a preview version 710 of the entire shared workspace for each shared workspace in the project.

The preview window 570B may comprise a user-interface (UI) control for enabling a user to select between different shared workspaces of the project (as discussed above). In addition, for display systems 100 having displays 120 with aspect ratios less than the assigned aspect ratio, a panning feature of the preview window 570B may be enabled. In this regard, the preview engine 550B may display a local viewport boundary 720 in the preview window 570 that indicates a corresponding portion (sub-area) of the standard shared workspace currently displayed in the viewport window 560B. In the example of FIG. 7A, the local viewport boundary 720 is displayed as a semi-transparent rectangular overlay on top the preview shared workspace 710. In other embodiments, the local viewport boundary 720 may be displayed in a different manner and/or with a different visual appearance.

The local viewport boundary 720 may comprise an interactive navigation window that enables panning of the standard shared workspace displayed in the viewport window 560B. A user may select and move the local viewport boundary 720 across the preview shared workspace 710A in the preview window 570A, which then causes corresponding panning of the standard shared workspace displayed in the viewport window 560B. For example, the user may click on (via a mouse) or touch (via a touchscreen) the local viewport boundary 720 and drag the local viewport boundary 720 across the preview shared workspace 710A. For example, in the screenshot of FIG. 7A, the local viewport boundary 720 is located on the far left side of the preview shared workspace 710A, which causes the viewport window 560B to be panned to the far left side of the standard shared workspace so that the far left side of the standard shared workspace is currently displayed in the viewport window 560B. A user may then select and move the local viewport boundary 720 to the far right side of the preview shared workspace 710A. This panning operation and result is shown in FIG. 7AB.

Figure 7B:
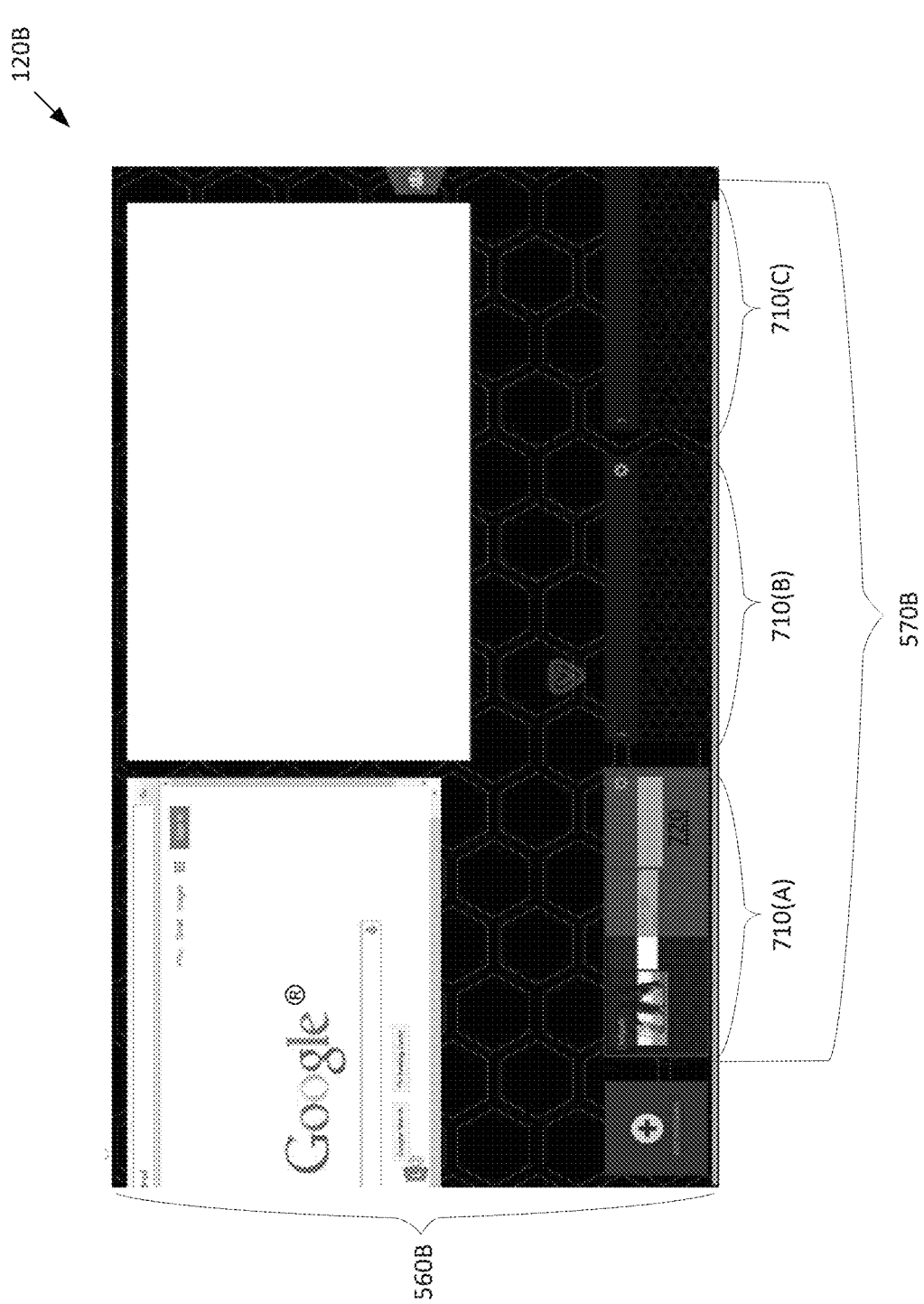
FIG. 7B is a screenshot of the small aspect ratio display of FIG. 7A after a panning operation, according to various embodiments of the present invention.

FIG. 7B is a screenshot of the small aspect ratio display 120B of FIG. 7A after a panning operation, according to various embodiments of the present invention. As shown, after the user moves the local viewport boundary 720 to the far right side of the preview shared workspace 710A, the preview engine 550B causes the corresponding panning of the standard shared workspace displayed in the viewport window 560B. Thus, the viewport window 560B is now panned to the far right side of the standard shared workspace so that the far right side of the standard shared workspace is currently displayed in the viewport window 560B. Thus, each time the local viewport boundary 720 is moved to a new portion of the preview shared workspace 710A in the preview window 570B, the corresponding portion of the standard shared workspace is then caused to be displayed in the viewport window 560B. In some embodiments, all assets of a workspace may be always rendered in the workspace, but may be either on-screen within the boundaries of the viewport window or outside the boundaries of the viewport window.

Figure 8:
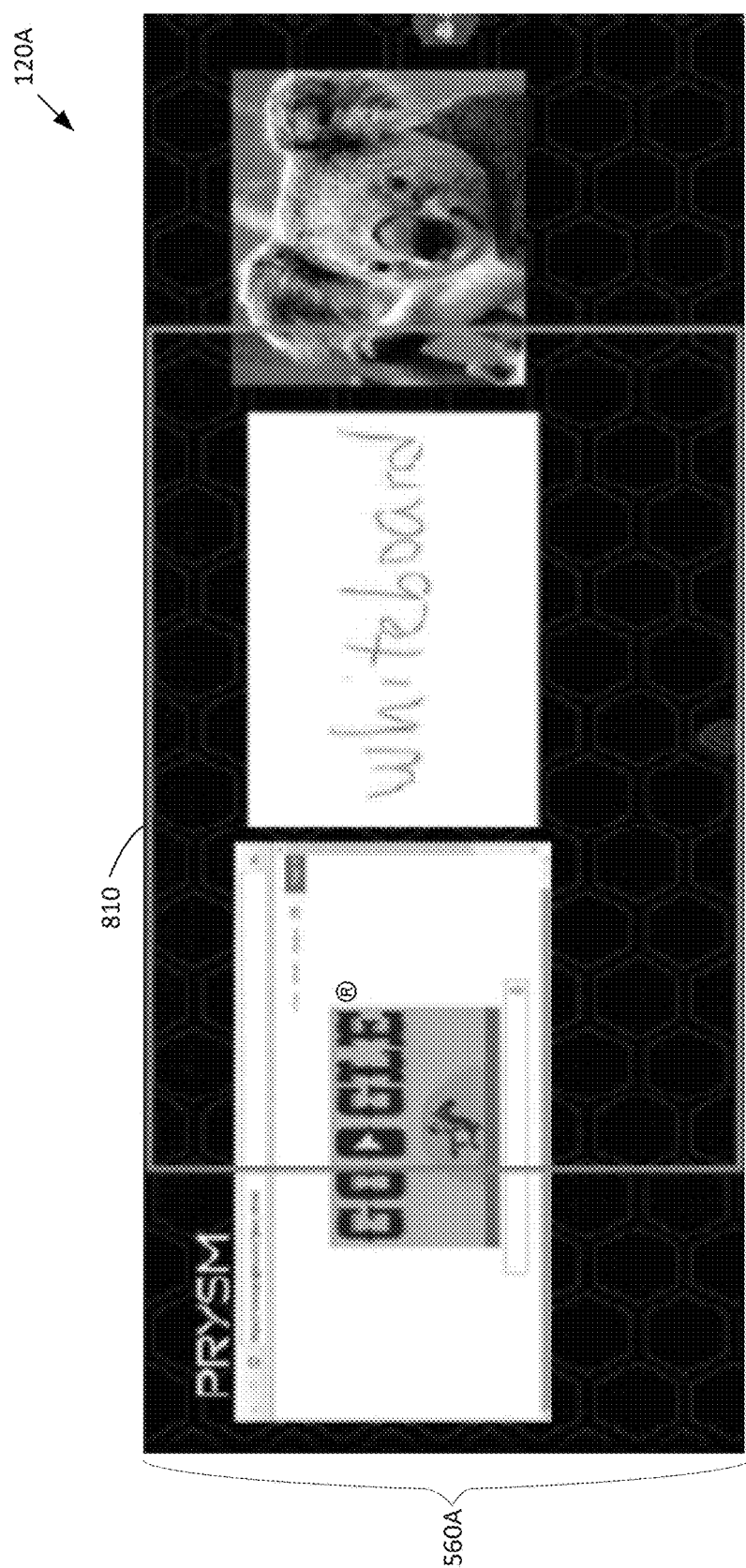
FIG. 8 is a screenshot of the remote boundary feature of FIG. 5 implemented on a display having a large aspect ratio, according to various embodiments of the present invention.

FIG. 8 is a screenshot of the remote boundary feature of FIG. 5 implemented on a display having a large aspect ratio, according to various embodiments of the present invention. The large aspect ratio display 120A may comprise the display of the first appliance 140A and first display system 100A shown in FIG. 5. The preview engine 550A of the first display system 100A may configure and display the exemplary screenshot of FIG. 6.

In the example of FIG. 8, the first appliance 140A is sharing the same shared workspace and project with the second appliance 140B, whereby each appliance 140 has opened the same project. When multiple users/appliances 140 are sharing the same shared workspace, the preview engine 550 of at least one appliance 140 may cause the local display 120 to display, in the viewport window 560, one or more remote viewport boundaries corresponding to one or more remote users/appliances 140. As shown, the preview engine 550A of the first appliance 140A causes the first display 120A to display a remote viewport boundary 810 corresponding to the second appliance 140B. The remote viewport boundary 810 indicates a portion of the standard shared workspace that is currently displayed in the viewport window 560B of the second display 120B of the second appliance 140B that is currently sharing the same shared workspace. The second display 120B has a smaller aspect ratio than the first display 120A. Thus, the portion of the shared workspace currently displayed in the viewport window 560B of the second display 1206 (indicated by the remote viewport boundary 810) is shown to be smaller than the area of shared workspace displayed in the viewport window 560A of the first display 120A.

In the example of FIG. 8, the remote viewport boundary 810 is displayed as a grey-colored rectangular overlay on top of the viewport window 560A. In other embodiments, the remote viewport boundary 810 may be displayed in a different manner and/or with a different visual appearance. If additional remote users/appliances 140 are sharing the shared workspace (such as the third appliance 140C), a remote viewport boundary corresponding to each additional remote appliance 140 may be displayed, each remote viewport boundary having a different visual appearance for each different remote user/appliance 140.

Each appliance 140 may send messages to other appliances 140 that are sharing the same project and shared workspace via the messaging infrastructure 240. For example, the second appliance 140B may send a message indicating the portion of the shared workspace that is currently displayed in its viewport window 560B to the first appliance 1406 (via the messaging infrastructure 240) whenever the portion of the shared workspace currently displayed in its viewport window 560B is changed. The preview engine 550A of the first appliance 140A receives this message and then updates the position of the remote viewport boundary 810 accordingly.

Figure 9:
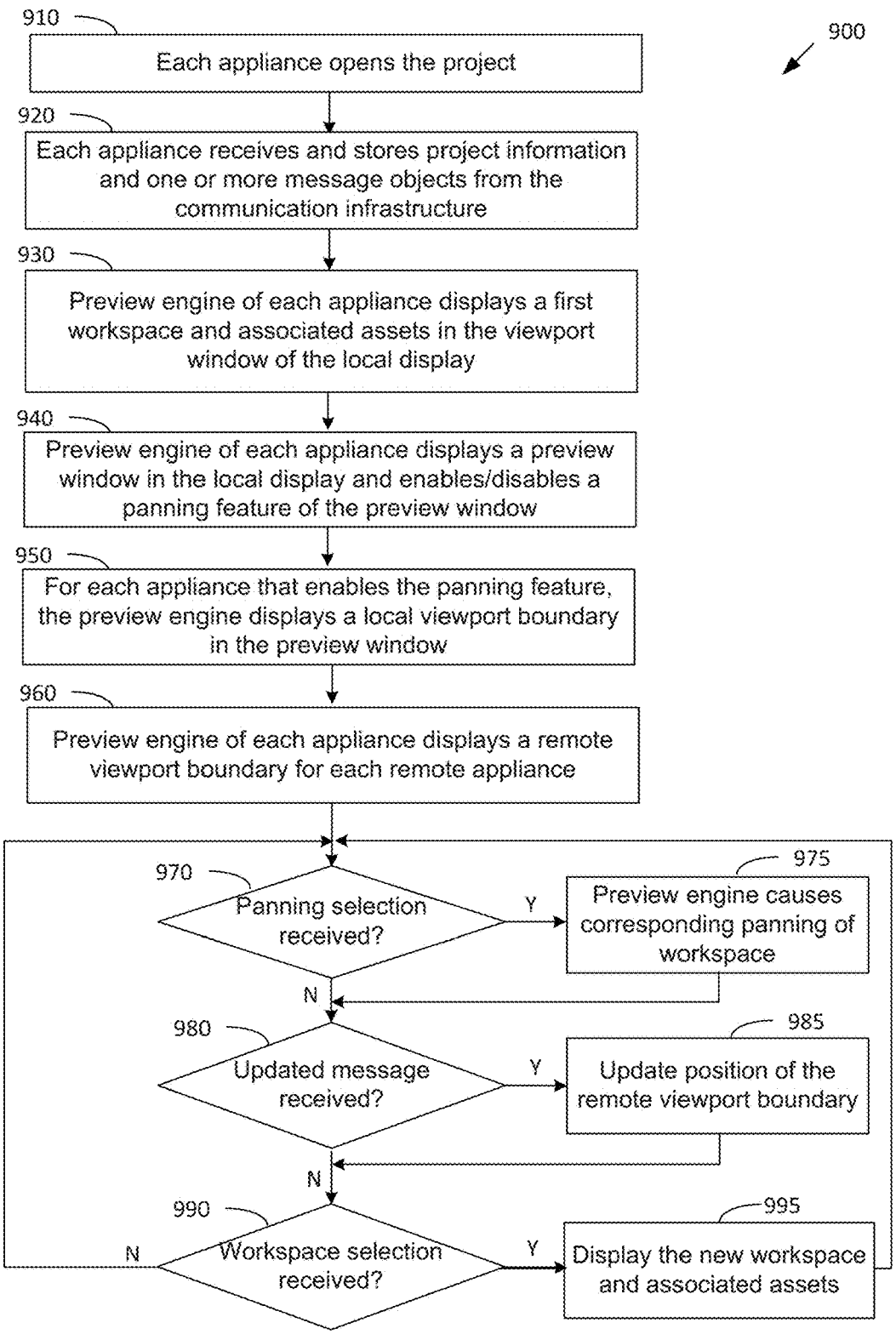
FIG. 9 illustrates a flow diagram of method steps for generating a shared workspace implementing a preview feature, according to various embodiments of the present invention.

FIG. 9 illustrates a flow diagram of method steps for generating a shared workspace implementing a preview feature in a collaborative system, according to various embodiments of the present invention. Although the method steps are described in conjunction with the systems of FIGS. 1-8, persons skilled in the art will understand that any system configured to perform the method steps, in any order, is within the scope of the present invention. In various embodiments, one or more preview engines 550 of one or more appliances 140 and display systems 100 may operate in conjunction with the communication infrastructure 210 to perform the method steps.

For illustrative purposes, a first display 120A of a first appliance 140A comprises a first aspect ratio, a second display 120B of a second appliance 140B comprises a second aspect ratio, and a third display 120C of a third appliance 140C comprises a third aspect ratio, wherein the first aspect ratio is equal to or greater than the assigned aspect ratio for a project, the second and third aspect ratios that are each less than the assigned aspect ratio for the project, and the third aspect ratio is less than the second aspect ratio. The first, second, and third appliances 140A-C may each comprise a client computing device that opens the same project on the communication infrastructure 210.

As shown, a method 900 begins at step 910, where one or more appliances 140 send a request to the communication infrastructure 210 to open the same project. For example, each appliance 140 may send a request specifying the project name and display characteristics of the local display 120 (such as the local display aspect ratio and dimensions).

At step 920, each appliance 140 receives project information and one or more message objects from the communication infrastructure 210 and stores the project information and message objects locally to memory or storage. In response to the project request from each appliance 140, the various servers of the streaming infrastructure 230 (such as collaboration server 310, database server 320, and file server 330) may work in conjunction to return all project information regarding the project to each appliance 140. As discussed above, each project may have an assigned aspect ratio, one or more associated shared workspaces, and one or more assets associated with each shared workspace. The returned project information may include files for the asset content (such as documents, images, and videos) of all assets associated with the project. The project information may also include metadata, such as metadata specifying identifiers for all shared workspaces associated with the project, metadata identifying which assets are associated with a particular shared workspace, aspect ratio metadata specifying an assigned aspect ratio for the project (projectAspectRatio), and asset metadata specifying the location/position and dimensions/size of each asset within its associated shared workspace (wherein the asset position and size may be expressed in percentage values).

Also in response to the project request from each appliance 140, the messaging infrastructure 240 may generate a message object for each appliance 140. In some embodiments, the message object comprises a data transfer object, such as the Participant Data Transfer Object (ParticipantDTO). In other embodiments, the message object comprises another type of data structure for organizing and storing data. Each message object may comprise entries for data such as a unique connection identifier for each appliance 140, client/user identifier or name, location of the appliance 140, project name, current shared workspace identifier, localprojectWidth (width of the project shared workspace), localprojectHeight (height of the project shared workspace), assigned appearance, viewport aspect ratio (ViewportRatio), and/or panning percentage (PanPercentage).

The current shared workspace identifier may identify the shared workspace that is currently displayed by a display 120 of an appliance 140. The current shared workspace identifier may initially default to a first shared workspace of the project. The localprojectWidth (width of the project shared workspace), localprojectHeight (height of the project shared workspace) may comprise pixel values calculated by each appliance 140 based on the local display dimensions using equations (1) and (2) discussed above. The assigned appearance may comprise a unique appearance (such as color) assigned to each appliance 140 that may be used to generate a remote viewport boundary for the appliance 140. The viewport aspect ratio (ViewportRatio) may comprise the aspect ratio of the viewport window 560 (in the case where the viewport window 560 comprises less than the entire display area of the local display 120) or the aspect ratio of the local display 120 (in the case where the viewport window 560 comprises the entire display area of the local display 120). The panning percentage (Pan Percentage) indicates the percentage of the current shared workspace to which the viewport window 560 of the display 120 is currently panned. Thus, the panning percentage indicates the panning location of the viewport window 560 in relation to the current shared workspace in terms of a percentage value. The panning percentage value may indicate the position of the far left side of the viewport window 560 in relation to the current shared workspace. For example, the panning percentage may initially default to a value of 0%, which indicates that the far left side of the viewport window 560 is on the far left side of the current shared workspace). Some data entries in the message object may be determined by each appliance 140 and returned to the messaging infrastructure 240, such as the current shared workspace identifier, the localprojectWidth (width of the project shared workspace), localprojectHeight (height of the project shared workspace), viewport aspect ratio (ViewportRatio), and/or panning percentage (PanPercentage).

Note that the messaging infrastructure 240 generates a message object for each appliance 140 and sends all the generated message objects to all appliances 140 that have opened the same project. For example, if the first, second, and third appliances 140A-C each open the same project, the messaging infrastructure 240 generates a message object for each appliance 140 and sends all three of the generated message objects to all the appliances 140. In this regard, at step 920, each appliance 140 receives and stores a message object for the appliance 140 as well as a message object for each other appliance 140 in the project. In some embodiments, each time an event at an appliance 140 triggers a change in any of the data in the message object for the appliance 140, the appliance 140 sends an updated message object with the updated data to the messaging infrastructure 240, which responds by sending the updated message object to each of the other appliances 140 in the same project. In this manner, each appliance 140 has locally stored information as well as continuously updated information regarding all other appliances 140 in the same project for enabling functions and features described herein. For example, the localprojectWidth (width of the project shared workspace), localprojectHeight (height of the project shared workspace), viewport aspect ratio (ViewportRatio), and/or panning percentage (PanPercentage) data for a first appliance 140 may be used by a second appliance 140 to generate a remote viewport boundary indicating a portion of the shared workspace currently displayed in the display 120 of a the first appliance 140.

At step 930, the preview engine 550 of each appliance 140 then displays a first shared workspace of the project and all assets associated with the first shared workspace in the viewport window 560 of the display 120. The preview engine 550 may display the first shared workspace by configuring a local version of the first shared workspace based on the received project information and characteristics (e.g., pixel dimensions and aspect ratio) of the local display 120. The preview engine 550 may determine the pixel dimensions (localprojectWidth and localprojectHeight) of the first shared workspace using equations (1) and (2) discussed above. The dimensions determined for the first shared workspace have the aspect ratio assigned to the project. The preview engine 560 determines the portion of the shared workspace to be initially displayed in the viewport window 560 using the pixel width of the display 120 (or pixel width of the viewport window 560) and the panning percentage (PanPercentage). In some embodiments, the panning percentage is initially set to 0% so that the panning location of the viewport window 560 is to the far left of the first shared workspace.

At step 930, the preview engine 550 of each appliance 140 also displays each associated asset in the proper size and position within the first shared workspace based on the received asset metadata for the asset. In some embodiments, the asset metadata may express the position and size of an asset in percentage values. In such embodiments, the size (width and height) and position (x, y) of the asset is represented in terms of percent locations along an x-axis and y-axis of the associated shared workspace (whereby the width, height, x, and y values are all represented as percent values). The preview engine 550 of each appliance 140 may convert these percentage values to pixel values for the size and position of the asset based on the characteristics of the local display 120 or viewport window 560 (such as pixel dimensions and aspect ratio of the local display or viewport window). Thus, the preview engine 550 may convert the percentage values for width, height, x, and y to pixel values for width, height, x, and y based on the local display or viewport window 560.

In some embodiments, the pixel size and location of an asset within a shared workspace is defined by the below equations:

$$aspectRatio = assetWidth/assetHeight \quad (3)$$

$$pX = xPos/localprojectWidth \quad (4)$$

$$pY = yPos/localprojectHeight \quad (5)$$

$$pHeight = assetHeight/localprojectHeight \quad (6)$$

$$x = localprojectWidth * pX \quad (7)$$

$$y = localprojectHeight * pY \quad (8)$$

$$height = localprojectHeight * pHeight \quad (9)$$

$$width = height * aspectRatio \quad (10)$$

In these equations, localprojectHeight equals the height (in pixels) of the shared workspace/project determined by equation (1), localprojectWidth equals the width (in pixels) of the shared workspace/project determined by equation (2), pX equals the x dimension of the position of the asset expressed as a percentage of the localprojectWidth, pY equals the y dimension of the position of the asset expressed as a percentage of the localprojectHeight, pHeight equals the height dimension of the asset expressed as a percentage of the localprojectHeight, height equals assetHeight and comprises the final computed locally-rendered pixel height of the asset, width equals assetWidth and comprises the final computed locally-rendered pixel width of the asset, and aspectRatio equals a proportional representation of the width/height ratio assigned to the workspaces of a project.

Also, the following four values comprising width (e.g., pWidth), height (e.g., pHeight), x, and y are specified in the asset metadata as percent values. Further, the four values comprising assetWidth, assetHeight, xPos, and yPos used to display the asset in the local display 120. AssetWidth equals the width (in pixels) of the asset, assetHeight equals the height (in pixels) of the asset, xPos equals the x position (in pixels) of the asset, and yPos equals the y position (in pixels) of the asset in the local display 120. For example, the reference point of the upper left corner of the display 120 may be set to equal (0,0) whereby the x axis increases from left to right and the y axis increases from top to bottom.

At step 940, the preview engine 550 of each appliance 140 then configures and displays a preview window 570 in the local display 120 and enables or not enable a panning feature of the preview window 570. The preview engine 550 may display a preview version of each shared workspace in the project in the preview window 570. For example, the preview engine 550 may capture and store a snapshot/image of each shared workspace in the project and display each image in the preview window 570, each image comprising a preview version of a particular shared workspace. For example, the snapshots may comprise thumbnail images. The preview window 570 may be displayed as an overlay on top of the viewport window 560 or as a separate window.

Each preview window 570 may comprise a user-interface (UI) control for enabling a user to 1) switch to a different shared workspace in the project (by selecting the corresponding preview shared workspace and 2) pan to different portions of the shared workspace as displayed in the viewport window 560. The preview engine 550 may determine whether to enabled or not enable the panning feature based on the aspect ratio of the display 120 or viewport window 560. In some embodiments, the preview engine 550 does not enable the panning feature if the aspect ratio of the display 120 or viewport window 560 is equal to or greater than the assigned aspect ratio for the project, and enables the panning feature if the aspect ratio of the display 120 or viewport window 560 is less than the assigned aspect ratio for the project. For example, the first appliance 140A may not enable the panning feature and the second appliance 140B and third appliance 140C enable the panning feature. In some embodiments, when the aspect ratio is defined as width/height, the panning feature enables horizontal (left and right) panning of the standard shared workspace implementing the preview window 570. In other embodiments, when the aspect ratio is defined as height/width, the panning feature enables vertical (up and down) panning of the standard shared workspace implementing the preview window 570.

At step 950, for each appliance 140 that has enabled the panning feature, the preview engine 550 then configures and displays a local viewport boundary 720 in the preview window 570. The local viewport boundary may be displayed as an overlay on the preview shared workspace corresponding to the shared workspace being displayed in the viewport window 560. In the preview shared workspace, the local viewport boundary 720 indicates a corresponding portion of the standard shared workspace currently displayed in the viewport window 560 of the local display 120. The local viewport boundary comprises an interactive navigation window that enables panning of the standard shared workspace in the viewport window 560. For example, the preview engine 550 may determine the dimensions/size of the local viewport boundary 720 using the aspect ratio of the display 120 or viewport window 560 (ViewportRatio) as the aspect ratio for the local viewport boundary 720, and determine the position of the local viewport boundary 720 on the preview shared workspace implementing the panning percentage (PanPercentage).

At step 960, the preview engine 550 of each appliance 140 then configures and displays a remote viewport boundary 810 for each remote appliance 140 that is currently in the same project. Each remote viewport boundary 810 may be displayed as an overlay on the viewport window 560, the remote viewport boundary 810 indicating a portion of the standard shared workspace that is currently displayed in the viewport window 560 of a remote display 120 of a corresponding remote user/appliance 140. Each remote viewport boundary 810 may have a different visual appearance for each different remote user/appliance 140. For example, for a particular remote user/appliance 140, the preview engine 550 may use the assigned appearance for the particular remote user/appliance 140 for determining the visual appearance (e.g., color, line appearance, etc.) for the remote viewport boundary 810, determine the dimensions/size of the remote viewport boundary 810 using the aspect ratio of the remote display 120 or remote viewport window 560 (ViewportRatio) as the aspect ratio for the remote viewport boundary 810, and determine the position of the remote viewport boundary 810 using the panning percentage (PanPercentage) for the particular remote user/appliance 140.

At step 970, the preview engine 550 of each appliance 140 determines if a user selection (panning selection) is received for moving the local viewport boundary 720 across the preview shared workspace in the preview window 570. If not, the method 900 continues at step 980. If so, in response to the user selection, the preview engine 550 (at step 975) causes corresponding panning of the standard shared workspace displayed in the viewport window 560. Thus, each time the local viewport boundary is moved to a new portion of the preview shared workspace in the preview window 570, the preview engine 550 causes the corresponding portion of the standard shared workspace to be displayed in the viewport window 560. At step 975, the preview engine 550 also updates the panning percentage (PanPercentage) in its message object to reflect the new panning location and sends the updated message object to the messaging infrastructure 240. In turn, the messaging infrastructure 240 sends the updated message object to all other appliances 140 sharing the same project. In effect then, the local appliance 140 sends an updated message object with the updated panning percentage (PanPercentage) to other remote appliances 140 sharing the same project via the messaging infrastructure 240. In this manner, each appliance 140 is continuously updated regarding the portion of the shared workspace currently displayed at each of the other appliances 140 sharing the same project. The method 900 then continues at step 980.

At step 980, the preview engine 550 of each appliance 140 determines if an updated message object is received from the messaging infrastructure 240, the updated message object containing an updated panning percentage (PanPercentage) for a particular remote appliance 140. If not, the method 900 continues at step 990. If so, in response to receiving the updated message object, the preview engine 550 (at step 985) updates the position of the remote viewport boundary 810 corresponding to the particular remote appliance 140 in its local viewport window 560 using the updated panning percentage (PanPercentage). The method 900 then continues at step 990.

At step 990, the preview engine 550 of each appliance 140 determines if a user selection is received for selecting a new shared workspace in the preview window 570 (e.g., by the user selecting the preview window corresponding to the new shared workspace). If not, the method 900 continues at step 970. If so, the preview engine 550 (at step 995) removes from display the current shared workspace and associated assets and configures and displays the new shared workspace and all assets associated with the new shared workspace in the viewport window 560 of the display 120. The preview engine 550 may configure and display the new shared workspace and associated assets implementing operations described in step 930. The method 900 then continues at step 970.

In sum, an appliance device is configured to display a shared workspace with the aspect ratio assigned to the shared workspace, regardless of the aspect ratio of the local display. The appliance device displays a portion (sub-area) of the standard shared workspace in a viewport window of the local display at one time. The appliance device is also configured to display a preview version of the entire shared workspace in a preview window, the preview shared workspace comprising a smaller display area than the standard shared workspace. A local viewport boundary is displayed over the preview shared workspace and indicates the portion of the standard shared workspace that is currently displayed in the viewport window. The preview window comprises a user-interface control which enables panning of the standard shared workspace displayed in the viewport window. The panning may comprise horizontal or vertical panning of the standard shared workspace. The appliance device may also be configured to display a remote viewport boundary indicating the standard shared workspace currently displayed in the viewport window of a remote appliance device.

At least one advantage of the disclosed technique is that the original aspect ratio of the shared workspace is maintained at each computer device regardless of the aspect ratio of the local display. Thus, no information of the shared workspace is lost and the layout appearance of the shared workspace is maintained, whereas in conventional techniques a substantial portion of information of the shared workspace may be lost and the layout appearance of the shared workspace is not consistent. Another advantage of the disclosed technique is that when the shared workspace is shared across different computer devices having displays of different aspect ratios, the layout appearance of the shared workspace appear consistent at each computer device that shares the same shared workspace.

Presentation Feature

Figure 10:
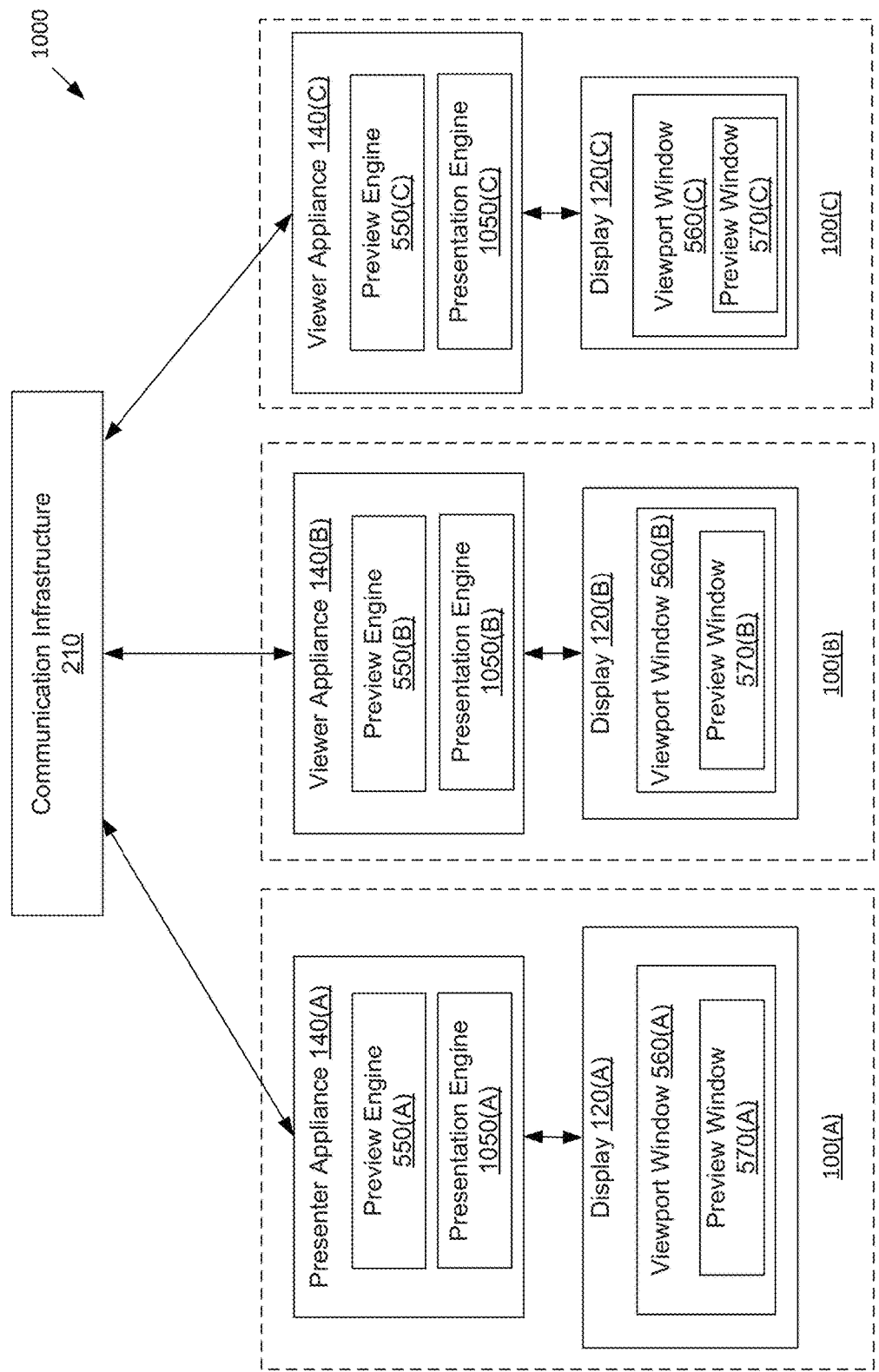
FIG. 10 is a conceptual diagram of a collaboration system configured to share a shared workspace implementing a presentation feature, according to various embodiments of the present invention.

FIG. 10 is a conceptual diagram of a collaboration system configured to share a shared workspace implementing a presentation feature, according to various embodiments of the present invention. As shown, collaboration system 1000 includes, without limitation, a communication infrastructure 210 connected with one or more display systems 100 (such as 100A, 1008, and 100C), each display system 100 comprising an appliance 140 (such as 140A, 140B, and 140C, respectively) and a display 120 (such as 120A, 120B, and 120C, respectively). Each appliance 140 comprises a client computing device that includes a central controller 110 (not shown) that executes a presentation engine 1050 and a preview engine 550. Presentation engine 1050 comprises a software program that generally reside within a memory (not shown) and is executed by a processor unit (not shown) included within the appliance 140. When executed, the presentation engines 1050 of the appliances 140 may operate in conjunction with the preview engines 550 of the appliances 140 and the communication infrastructure 210 to perform a presentation technique for sharing a shared workspace.

Similar to the collaboration system 500 of FIG. 5, the collaboration system 1000 of FIG. 10 may share a shared workspace with display systems 100 and appliances 140 having displays 120 with various aspect ratios. As shown, a first appliance 140A comprises a first display 120A having a first aspect ratio, a second appliance 140B comprises a second display 120B having a second aspect ratio, and a third appliance 140C comprises a third display 120C having a third aspect ratio. In the example of FIG. 10, relative to the first, second, and third aspect ratios, the first aspect ratio is the largest aspect ratio, the second aspect ratio is the second largest aspect ratio, the third aspect ratio is the smallest aspect ratio, the first aspect ratio is equal to or greater than the assigned aspect ratio for the project, and the second and third aspect ratios are each lower than the assigned aspect ratio for the project. Various components of the collaboration system 1000 are described in relation to the collaboration system 500 of FIG. 5 and are not discussed in detail here.

In some embodiments, the collaboration system 1000 of FIG. 10 executes a presentation mode/technique that enables a particular appliance 140 to make a presentation to one or more remote appliances 140 using a shared project/shared workspace. The presentation mode/technique is sometimes referred to herein as the "follow-me" mode/technique. The presentation mode may be enabled whenever two or more appliances 140 are engaged in the same project/shared workspace, the user/appliance 140 performing the presentation being designated as the presenter/presenter appliance 140 and all other users/appliances 140 being designated as viewers/viewer appliances 140. When enabled, the presentation mode allows the presenter/presenter appliance 140 to interact with the shared workspace of the project (e.g., to select or highlight an asset, type text into an asset, touch or move a cursor to a specific location in the shared workspace, etc.). Viewers/viewer appliances 140 are preferably prevented from interacting with the shared workspace during the presentation (while presentation mode is enabled) which avoids accidental viewer interactions from disrupting the presentation.

When in the presentation mode, as the presenter/presenter appliance 140 interacts with specific locations of the shared workspace (referred to herein as "interacted locations"), the collaboration system 1000 automatically causes the one or more viewer appliances 140 to display the corresponding portions of the shared workspace that include the interacted locations in the local displays 120. The collaboration system 1000 may do so implementing message objects sent from the presenter appliance 140 to the view appliances 140 via the messaging infrastructure 240. For example, for each interaction with the shared workspace, the presentation engine 1050 of the presenter appliance 140 may update the message object for the presenter appliance 140 to indicate the location of the interaction in the shared workspace and send the updated message object to the messaging infrastructure 240.

In turn, the messaging infrastructure 240 sends the updated message object to each viewer appliance 140. The presentation engine 1050 of each viewer appliance 140 may then determine and display a corresponding portion of the shared workspace that includes the interacted location in the viewport window 560 of the local display 120. In effect, the presentation engine 1050 of each viewer appliance 140 renders the shared workspace displayed in the viewport window 560 of the local display 120 based on the location of interaction so that the viewport window 560 displays a corresponding portion of the shared workspace that includes the location of interaction. In some embodiments, the panning (region of the total workspace that is visible within the viewport window) is updated so that it matches the last location of interaction of the presenter appliance and rendering information may be determined locally as if presentation mode was not enabled.

Thus, while in presentation mode, a presenter/presenter appliance 140 may make a presentation while interacting with a shared workspace while the viewers/viewer appliances 140 may watch the presentation. The preview engine 550 of a viewer appliance 140 may display the shared workspace with the aspect ratio assigned to the shared workspace and display only portion of the shared workspace in the viewport window 560 at any given time, as described above in relation to FIGS. 5-9. When the presenter/presenter appliance 140 interacts with a particular location of the shared workspace, the presentation engine 1050 and preview engine 550 of the presenter appliance 140 may operate in conjunction with the messaging infrastructure 240 and the presentation engines 1050 and preview engines 550 of the viewer appliances 140 to automatically cause the viewer appliances 140 to pan to and display the corresponding location of interaction in the shared workspace. This allows the assigned aspect ratio of the shared workspace to be maintained at each viewer appliance 140 watching the presentation of the shared workspace (regardless of the aspect ratio of the local display of the viewer appliance 140), while also automatically panning to and displaying the locations of the shared workspace that the presenter is currently interacting.

In some embodiments, the presentation engine 1050 of the presenter appliance 140 may display, in the viewport window 560, one or more remote viewport boundaries corresponding to the one or more remote viewers/viewer appliances 140. Each remote viewport boundary may indicate a portion of the shared workspace that is currently displayed in the display 120 of a particular remote viewer/viewer appliance 140 that is sharing the shared workspace. Each remote viewport boundary may have a different visual appearance for each different remote viewer/viewer appliance 140. In some embodiments, each appliance 140 may also display an user/appliance legend that displays information regarding the presenter and each viewer (e.g., name, location, current shared workspace, etc.) and a visual appearance assigned to each appliance 140 (e.g., color, line appearance, etc.). The visual appearance assigned to an appliance 140 comprises the visual appearance used for displaying a remote viewport boundary corresponding to the appliance 140. In this way, the presenter can see portion of the shared workspace that is visible to specific viewers during the presentation.

In some embodiments, during the presentation mode, each viewer appliance 140 may disable/opt-out of the presentation mode to perform independent panning of the shared workspace. For example, the viewer may select an interactive toggle to enable/disable the presentation mode. Also, the user may select and move a local viewport window displayed over a preview version of the shared workspace in the preview window 570, which automatically causes the presentation mode to be disabled. When in the presentation mode, the viewer appliance 140 may separately pan and view different portions of the shared workspace as desired. In some embodiments, when the presenter/presenter appliance 140 interacts with a new location in the shared workspace, the presentation mode is automatically re-enabled on the viewer appliance 140 and the viewer appliance 140 automatically displays a portion of the shared workspace that includes the new interacted location. In this way, as the viewer is watching the presentation, the viewer may also separately pan to portions of the shared workspace of interest, and when the presenter again interacts with the shared workspace, the interacted location is automatically displayed at the viewer appliance 140.

In the example of FIG. 10, the first appliance 140A comprises the presenter appliance 140 and the second and third appliances 140B and 140C each comprise a viewer appliance 140. As described above, the first display 120A of the first appliance 140A has a first aspect ratio that is equal to or greater than the assigned aspect ratio so that the entire shared workspace may be displayed in the viewport window 560A at one time. The second and third displays 120B and 120C of the second and third appliances 140B and 140C, respectively, each have aspect ratios that are each less than the assigned aspect ratio so that only a portion (sub-area) of the shared workspace is displayed in the viewport window 560, at one time. In other embodiments, however, the presenter appliance 140 and viewer appliances 140 may have different aspect ratios relative to each other and relative to the assigned aspect ratio. For example, the presenter appliance 140 may have a smaller aspect ratio than the aspect ratio of the viewer appliances 140.

Figure 11:
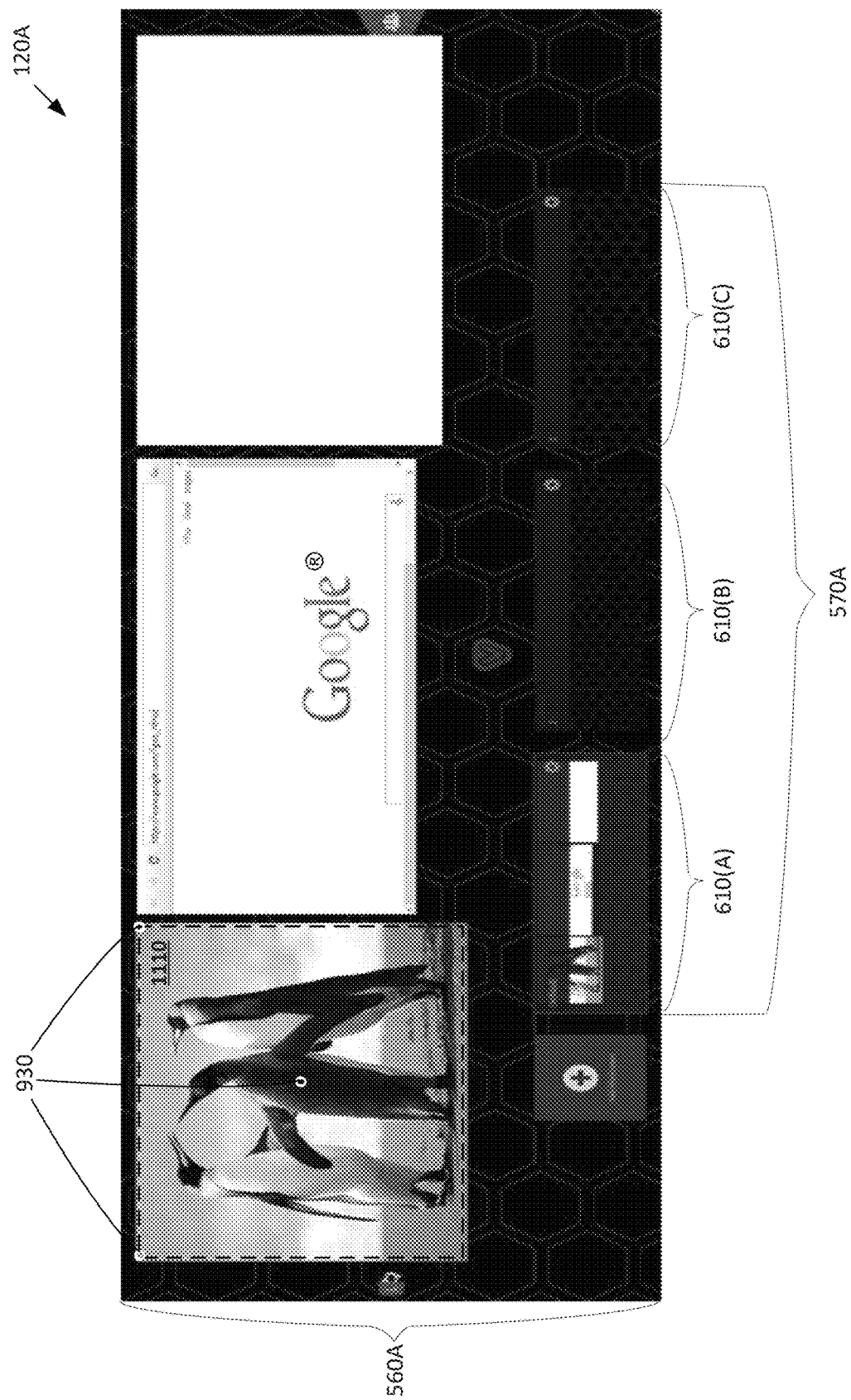
FIG. 11 is a first screenshot of the presentation feature of FIG. 10 implemented via a presenter display, according to various embodiments of the present invention.

FIG. 11 is a first screenshot of the presentation feature of FIG. 10 implemented via a presenter display, according to various embodiments of the present invention. In the example of FIG. 11, the presenter display 120A may comprise the display of the first appliance 140A and first display system 100A shown in FIG. 10, the first appliance 140A designated as the presenter appliance 140. As shown, the viewport window 560A of the display 120A displays the entire first shared workspace for a project at one time and a preview window 570A displays a preview shared workspace (preview version) of each shared workspace in the project (such as 610A, 610B, and 610C).

While in presentation mode, the presenter may interact with a specific location in the shared workspace currently displayed in the viewport window 560A. For example, the presenter may interact with an asset in the shared workspace by selecting, highlighting, or modifying the asset, such as typing text into an asset or making marks in the asset (e.g., for a whiteboard application). As a further example, the presenter may interact with a location of the shared workspace by simply moving a cursor to the location. The presenter interaction with the shared workspace can be performed implementing various methods, such as via touch or gesture-based interactions, clicking via a mouse or trackball, entering text via a keyboard, etc.

In the example of FIG. 11, the presenter interacts with an image asset 1110 (comprising a picture of three penguins). When the presenter interacts with an asset, the location of the interaction may be determined by the presentation engine 1050A of the presenter appliance 140A using a predetermined point/area 1120 of the asset, such as the center of the asset, upper-left corner of the asset, upper-right corner of the asset, etc. In other embodiments, any other predetermined point 1120 of the asset may be used to determine the location of interaction. The presentation engine 1050A of the presenter appliance 140A may then update the message object for the presenter appliance 140A to specify the location of the interaction. The presentation engine 1050A then sends the updated message object to the messaging infrastructure 240, which responds by sending the updated message object to each of the viewer appliances 140.

Figure 12:
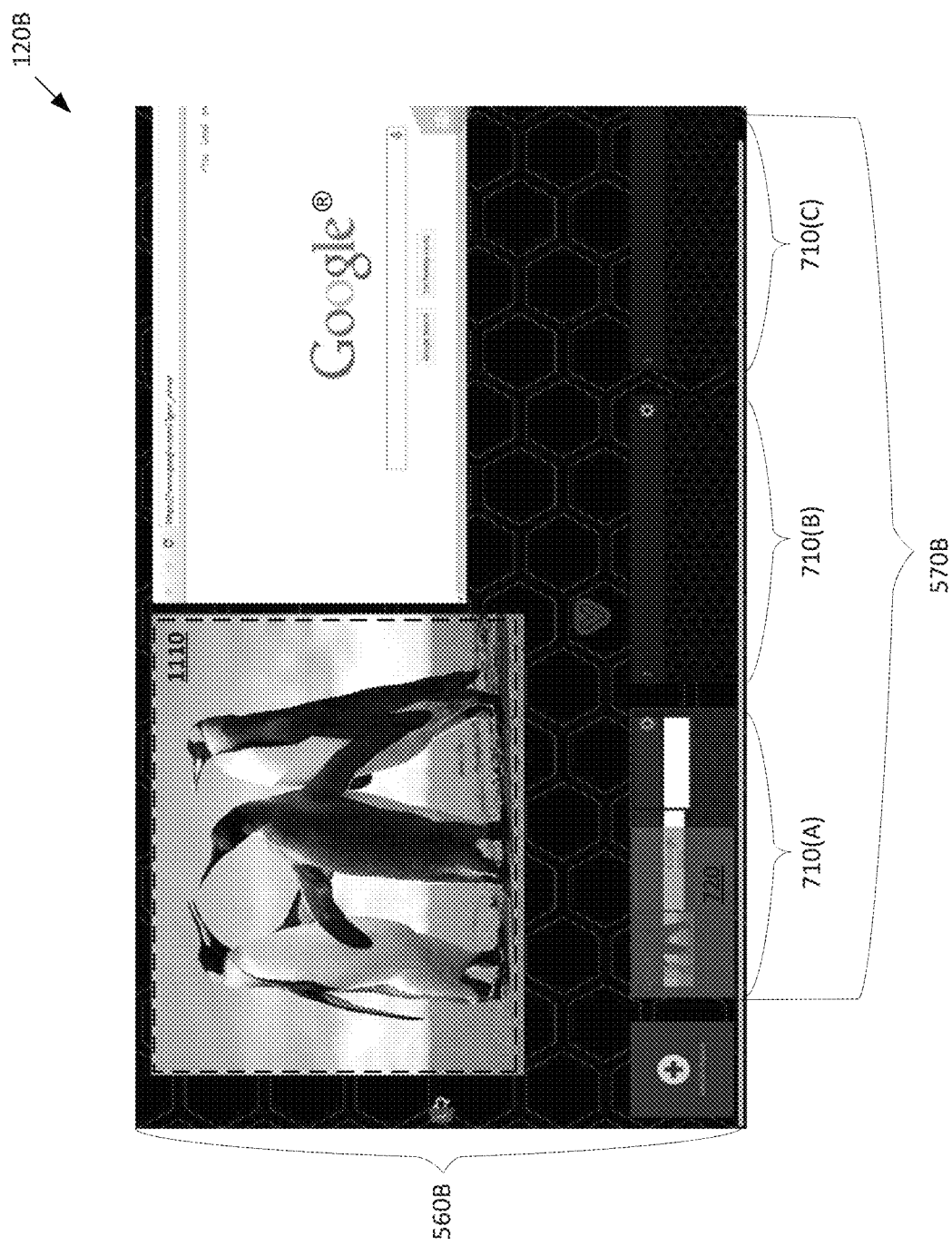
FIG. 12 is a first screenshot of the presentation feature of FIG. 10 implemented via a viewer display, according to various embodiments of the present invention.

FIG. 12 is a first screenshot of the presentation feature of FIG. 10 implemented via a viewer display, according to various embodiments of the present invention. In the example of FIG. 12, the viewer display 120B may comprise the display of the second appliance 1406 and second display system 1006 shown in FIG. 10, the second appliance 140B designated as a viewer appliance 140. As shown, the viewport window 560B of the display 1206 displays a portion of the first shared workspace for a project at one time and a preview window 570B displays a preview shared workspace (preview version) of each shared workspace in the project (such as 710A, 710B, and 710C).

The presentation engine 1050B of the viewer appliance 140B receives the updated message object from the messaging infrastructure 240, the updated message object specifying a location of interaction for an asset 1110. The presentation engine 1050 of the viewer appliance 140B may then determine and display a corresponding portion of the shared workspace that includes the interacted location in the viewport window 560B of the local display 120B. In the example of FIG. 12, the presentation engine 10506 of the viewer appliance 1406 pans to the far left of the shared workspace so that the location of interaction and the interacted asset 1110 is displayed in the viewport window 560B.

Figure 13:
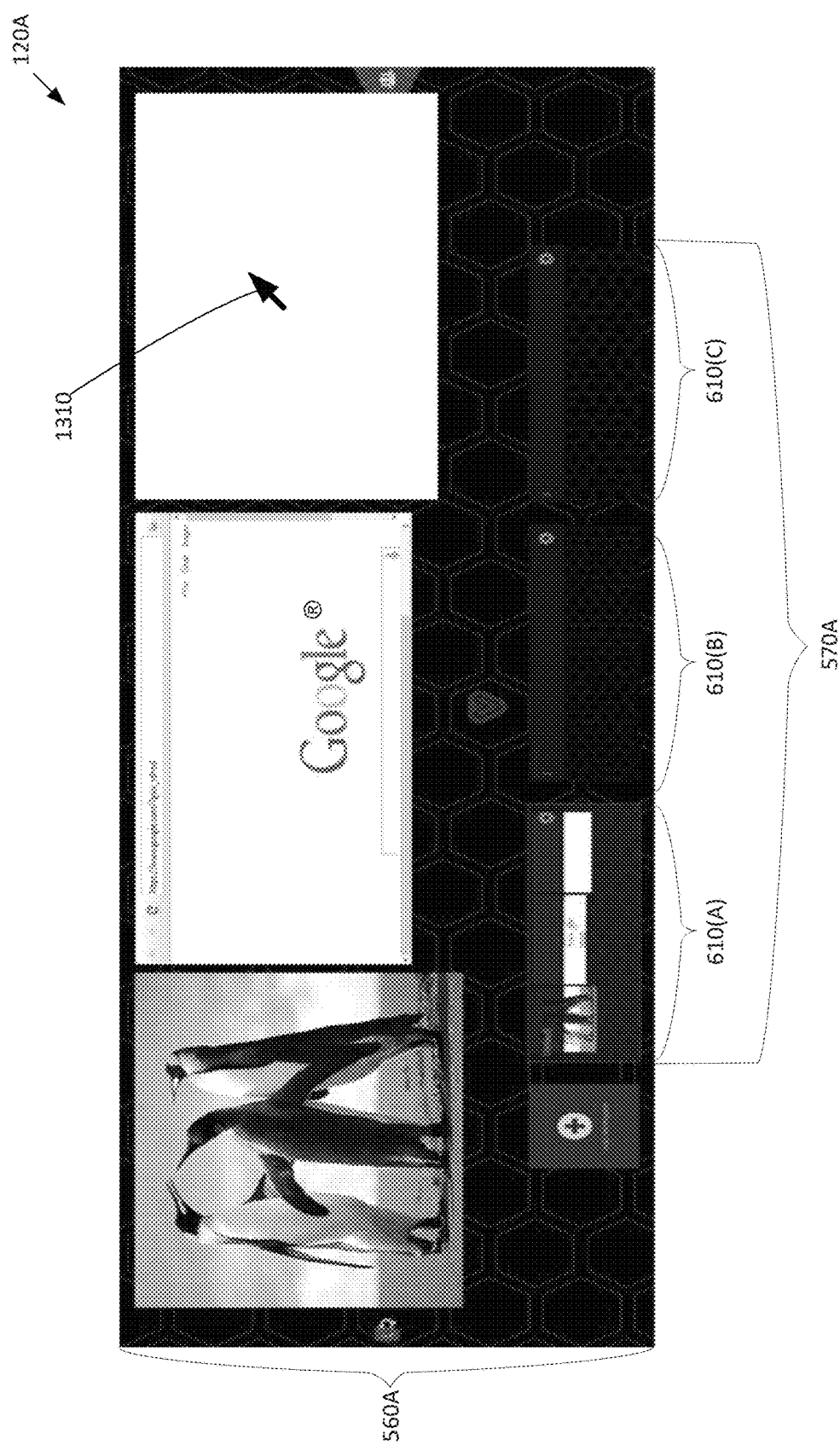
FIG. 13 is a second screenshot of the presentation feature implemented via the presenter display of FIG. 11, according to various embodiments of the present invention.

FIG. 13 is a second screenshot of the presentation feature implemented via the presenter display of FIG. 11, according to various embodiments of the present invention. In the example of FIG. 13, the presenter again interacts with the shared workspace displayed in the viewport window 560A by moving a cursor to a new location 1310 towards the far-right of the shared workspace. When the presenter moves the cursor to a new location in the shared workspace, the presentation engine 1050A of the presenter appliance 140A determines the new location of the cursor interaction and updates the message object for the presenter appliance 140A to specify the new location of the interaction. The presentation engine 1050A then sends the updated message object to the messaging infrastructure 240, which responds by sending the updated message object to each of the viewer appliances 140.

Figure 14:
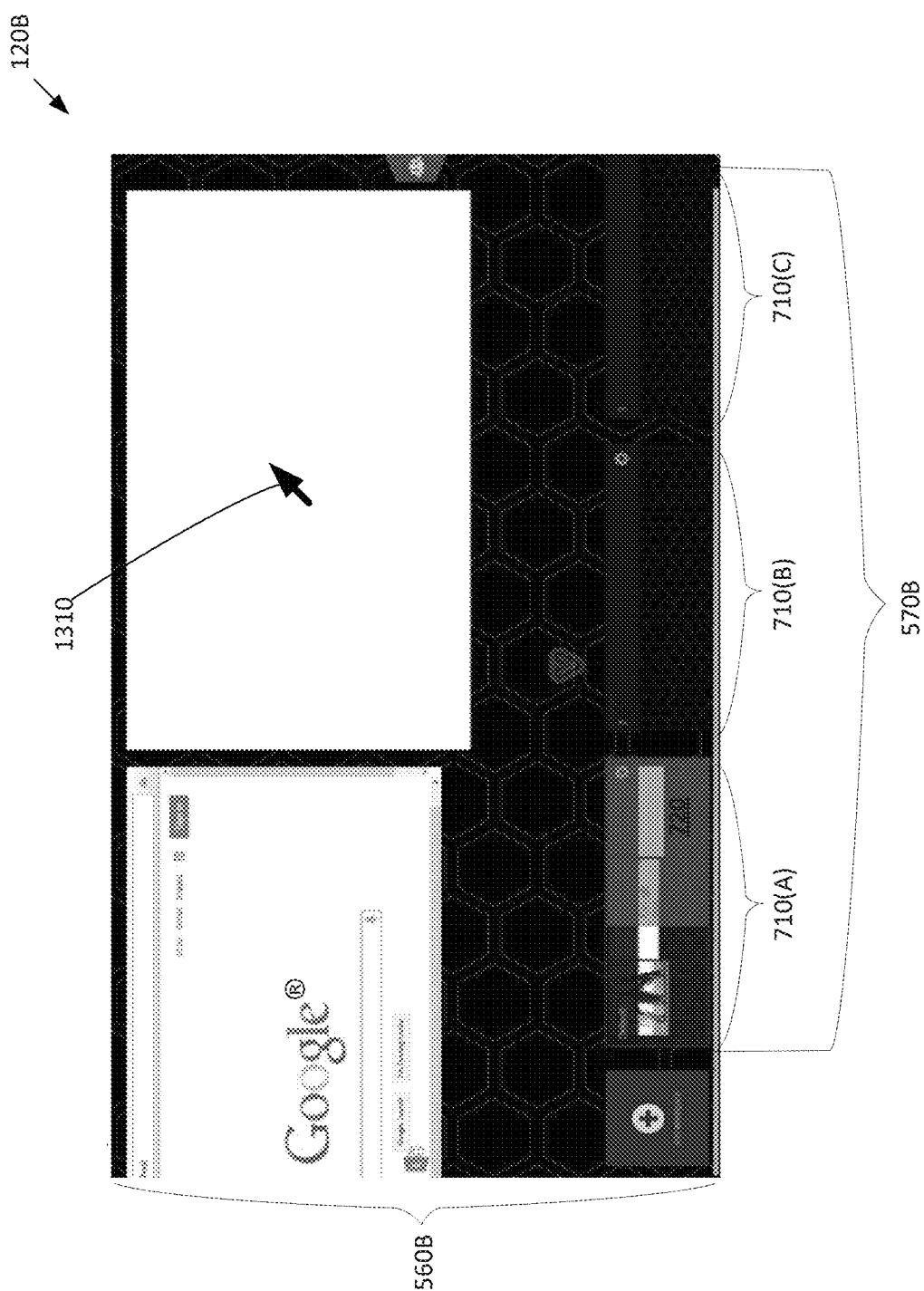
FIG. 14 is a second screenshot of the presentation feature implemented via the viewer display of FIG. 12, according to various embodiments of the present invention.

FIG. 14 is a second screenshot of the presentation feature implemented via the viewer display of FIG. 12, according to various embodiments of the present invention. The presentation engine 10506 of the viewer appliance 1406 receives the updated message object from the messaging infrastructure 240, the updated message object specifying a location of a cursor interaction 1310. The presentation engine 1050 of the viewer appliance 140B may then determine and display a corresponding portion of the shared workspace that includes the location of a cursor interaction 1310 in the viewport window 560B of the local display 120B. In the example of FIG. 14, the presentation engine 10506 of the viewer appliance 1406 pans to the far right of the shared workspace so that the location of the cursor interaction 1310 is displayed in the viewport window 560B.

Thus, the viewer appliance 140B may initially display a first portion of the shared workspace (shown in FIG. 12) in the viewport window 560B of the viewer display 120B. In response to receiving a new location of presenter interaction, the viewer appliance 1406 then displays a second portion of the shared workspace (shown in FIG. 14) in the viewport window 560B of the viewer display 1206 based on the new location of presenter interaction. In some embodiments, the first and second portions of the shared workspace do not overlap and thus do not share any common area of the shared workspace. In other embodiments, the first and second portions of the shared workspace overlap and thus have at least some common area of the shared workspace. In either case, the first and second portions of the shared workspace are different portions of the shared workspace that do not completely overlap.

In some embodiments, the first portion of the shared workspace does not include the new location of presenter interaction. In other embodiments, the first portion of the shared workspace does include the new location of presenter interaction. For example, the new location of presenter interaction may reside towards a side of the first portion, whereby the viewer appliance 140B configures and displays the second portion of the shared workspace so that the new location of presenter interaction resides in the center or at least closer to the center of the second portion (relative to the position of the new location of presenter interaction in the first portion). Thus, even though the first portion of the shared workspace already includes the new location of presenter interaction, the viewer appliance 140B may still pan to a different portion (the second portion) of the shared workspace to provide a better view of the new location of presenter interaction to the viewer. In either case, the viewer appliance 140B determines the second portion of the shared workspace to be next displayed based on the new location of presenter interaction.

During the presentation mode, the viewer/viewer appliance 140B may disable the presentation mode by selecting an interactive mode toggle or selecting and moving a local viewport window 720 displayed over a preview version of the current shared workspace in the preview window 570B (which automatically disables the presentation mode). The viewer may then pan the shared workspace as desired until the presenter/presenter appliance 140 interacts with a new location in the shared workspace, whereby the presentation mode is then automatically re-enabled on the viewer appliance 140B. The shared workspace may be panned implementing the local viewport window 720 in the preview window 570B implementing the preview techniques described above in relation to FIGS. 5-9.

Figure 15:
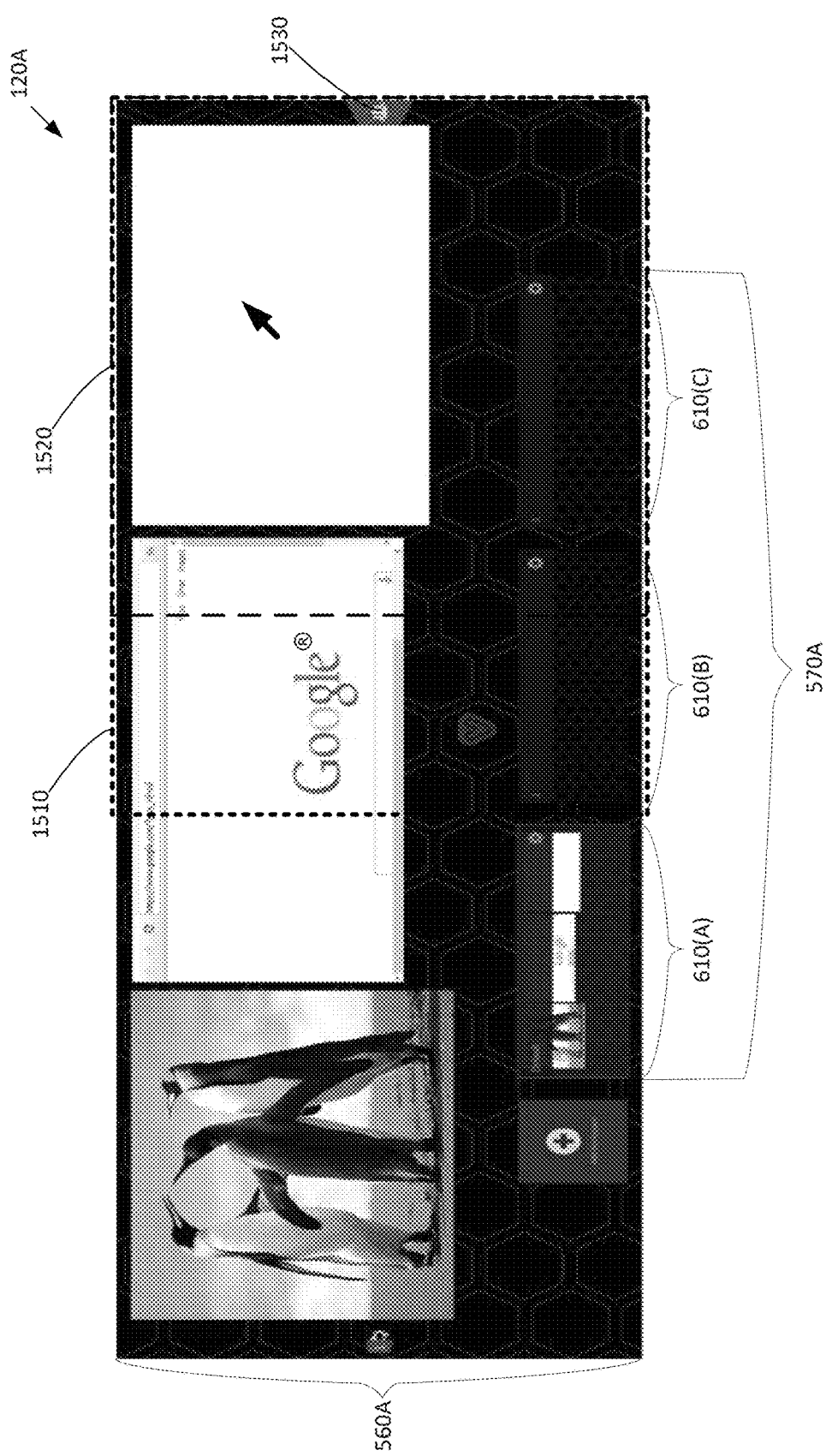
FIG. 15 is a screenshot of a remote boundary feature implemented via the presenter display of FIG. 11, according to various embodiments of the present invention.

FIG. 15 is a screenshot of a remote boundary feature implemented via the presenter display of FIG. 11, according to various embodiments of the present invention. As shown, the presentation engine 1050A of the presenter appliance 140A may display, in the presenter display 120A, one or more concurrent workspace collaboration remote viewport boundaries corresponding to the one or more remote viewers/viewer appliances 140. Each remote viewport boundary may indicate a portion of the shared workspace that is currently displayed in the display 120 of a particular remote viewer/viewer appliance 140 that is sharing the shared workspace. In the example of FIG. 15, the presenter display 120A displays a first remote viewport boundary 1510 corresponding to a first viewer appliance 140 (e.g., the second appliance 140B) and a second remote viewport boundary 1520 corresponding to a second viewer appliance 140 (e.g., the third appliance 140C). In this manner, the presenter can see portion of the shared workspace that is visible to each viewer during the presentation.

In general, when a viewer appliance 140 pans the display of the shared workspace based on an updated message object, the viewer appliance 140 also updates the message object for the viewer appliance 140 to indicate the portion of the shared workspace currently displayed in the viewport window 560 of the local display 120. Each viewer appliance 140 sends its updated message object to the messaging infrastructure 240, which responds by sending the updated message objects to each of the other appliances 140, including the presenter appliance 140. In some embodiments, each viewer appliance within a current workspace collaboration may concurrently communicate with the messaging infrastructure 240 for updates of message objects for updating the client viewports or displays with current presenter shared workspace. The presentation engine 1050A of the presenter appliance 140 then updates the position of the remote viewport boundary for each viewer appliance 140 based on the received updated message objects. Specific functions and operations related to remote viewport boundaries are discussed above in relation to FIGS. 5-9 and are not discussed in detail here.

In some embodiments, the presentation engine 1050A of the presenter appliance 140 briefly displays (flash displays) the remote viewport boundary for each viewer appliance 140 each time the portion of the shared workspace displayed at the viewer display 120 is changed (e.g., display for less than a second). In this way, the remote viewport boundaries will not be distracting for the presenter. In other embodiments, the presenter appliance 140 may briefly display the remote viewport boundary for a particular viewer appliance 140 when it receives a user input from the presenter to flash the remote viewport boundary for the particular viewer appliance 140 (e.g., using an user/appliance legend discussed below). In further embodiments, the presenter appliance 140 continuously displays the remote viewport boundary for each viewer appliance 140 during the presentation. Each appliance 140 may also display an user/appliance legend that may be displayed, for example, upon selection of a legend toggle 1530 (as shown in FIG. 15).

Figure 16:
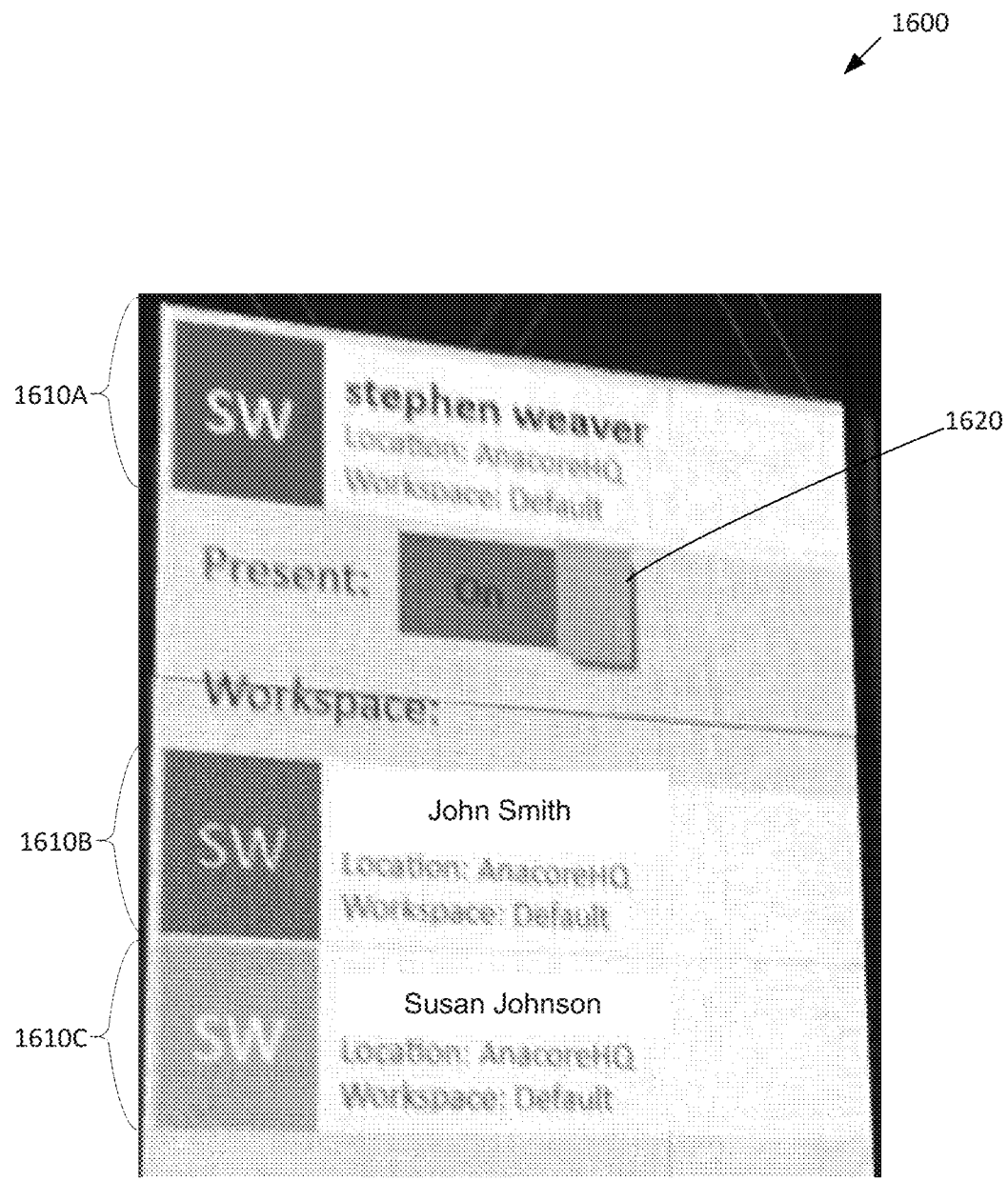
FIG. 16 is a screenshot of a user/appliance legend implemented in the collaboration system of FIG. 10, according to various embodiments of the present invention.

FIG. 16 is a screenshot of a user/appliance legend 1600 implemented in the collaboration system 1000 of FIG. 10, according to various embodiments of the present invention. As shown, the user/appliance legend 1600 displays entries 1610 for each user/appliance 140 currently sharing the same project. For example, the user/appliance legend 1600 may display a first entry 1610A for a presenter/presenter appliance 140A, a second entry 1610B for a first viewer/viewer appliance 140B, and a third entry 1610B for a second viewer/viewer appliance 140C. Each entry 1610 displays information for the corresponding user/appliance 140 such as user name, location, current shared workspace, etc. Each entry 1610 may also display a different visual appearance assigned to each user/appliance 140 that comprises the visual appearance used for displaying a remote viewport boundary corresponding to the user/appliance 140. For example, the visual appearance of the remote viewport boundaries may vary in color, shading darkness, and/or line appearances.

In some embodiments, the user/appliance legend 1600 comprises a user-interface (UI) control mechanism. In these embodiments, each entry 1610 may also comprise a user-interface (UI) control mechanism that, when selected, briefly displays a remote viewport boundary for the user/appliance 140 corresponding to the selected entry 1610. In further embodiments, the user/appliance legend 1600 may include a presentation mode toggle 1620 to enable/disable the presentation mode.

Figure 17:
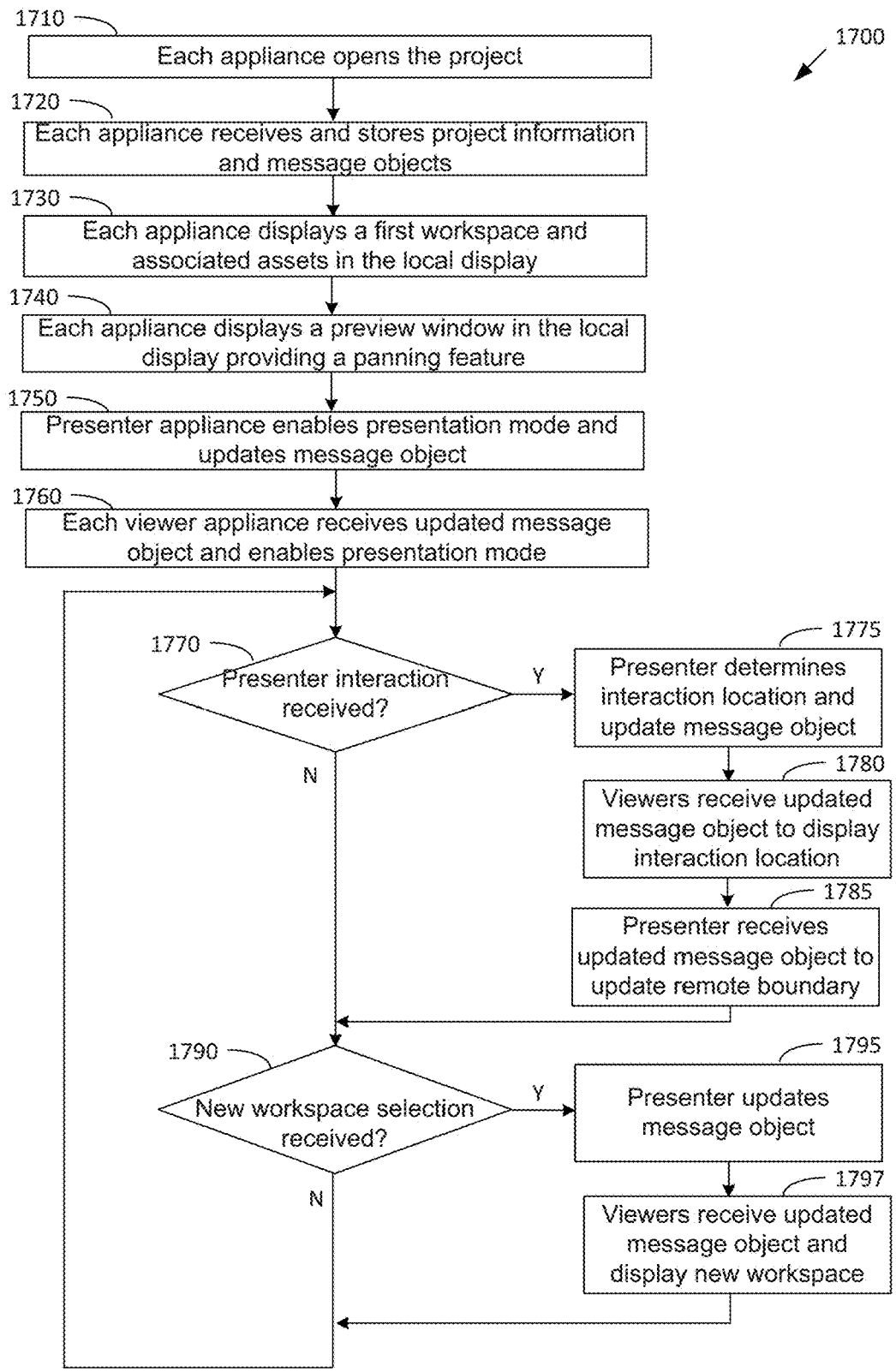
FIG. 17 illustrates a flow diagram of method steps for generating a shared workspace implementing a presentation feature, according to various other embodiments of the present invention.

FIG. 17 illustrates a flow diagram of method steps for generating a shared workspace implementing a presentation feature, according to various other embodiments of the present invention. Although the method steps are described in conjunction with the systems of FIGS. 1-8 and 10-16, persons skilled in the art will understand that any system configured to perform the method steps, in any order, is within the scope of the present invention. In various embodiments, presentation engines 1050 and preview engines 550 of appliances 140 may operate in conjunction with the communication infrastructure 210 to perform the method steps.

For illustrative purposes, the first appliance 140A comprises the presenter appliance 140 and the second and third appliances 140B and 140C each comprise a viewer appliance 140. The first display 120A of the first appliance 140A may have a first aspect ratio that is equal to or greater than the assigned aspect ratio so that the entire shared workspace may be displayed in the viewport window 560A at one time. The second and third displays 1206 and 120C of the second and third appliances 1406 and 140C, respectively, each may have aspect ratios that are each less than the assigned aspect ratio so that only a portion (sub-area) of the shared workspace is displayed in the viewport window 560, at one time. In other embodiments, a presenter appliance 140 and viewer appliances 140 comprise displays with different aspect ratios than those illustrated here. In some embodiments, an assigned aspect ratio is a fixed property on a project that may be modified by a user. The modified assigned aspect ratio is persistent and may cause asset content to be reformatted to fit within the new aspect ratio. For example, in the case where the modified assigned aspect ratio causes a decrease in the width property, asset content x-values may be positioned proportionately into the new aspect ratio (scaled). In the case where the modified assigned aspect ratio causes an increase of the width property, the workspace may be extended to the right with empty space and all asset content left unchanged.

As shown, a method 1700 begins at step 1710, where one or more appliances 140 send a request to the communication infrastructure 210 to open the same project. For example, each appliance 140 may send a request specifying the project name and display characteristics of the local display 120 (such as the local display aspect ratio and dimensions).

At step 1720, each appliance 140 receives project information and one or more message objects from the communication infrastructure 210 and stores the project information and message objects locally to memory or storage. In response to the project request from each appliance 140, the various servers of the streaming infrastructure 230 (such as collaboration server 310, database server 320, and file server 330) may work in conjunction to return all project information regarding the project to each appliance 140. Each project may have an assigned aspect ratio, one or more associated shared workspaces, and one or more assets associated with each shared workspace. The returned project information may include files for the asset content of all assets associated with the project and metadata such as aspect ratio metadata and asset metadata (described above in relation to FIG. 9).

Also in response to the project request from each appliance 140, the messaging infrastructure 240 may generate a message object for each appliance 140. Each message object may comprise entries for various types of data, such as a unique connection identifier for each appliance 140, client/user identifier or name, location of the appliance 140, project name, current workspace identifier, localprojectWidth (width of the project workspace), localprojectHeight (height of the project workspace), assigned appearance, viewport aspect ratio (ViewportRatio), and/or panning percentage (PanPercentage), which are described above in conjunction with FIG. 9.

In some embodiments, each message object also includes entries for presenter identifier, presenter shared workspace identifier, and/or presenter interaction location. The presenter identifier is used to identify the presenter/presenter appliance 140. For example, the presenter identifier may comprise the connection identifier for the presenter appliance 140 and/or the client/user identifier or name of the presenter. The presenter shared workspace identifier may identify the particular shared workspace of the project that is currently displayed in the viewport window 560A of the presenter display 120A. For example, the presenter shared workspace identifier may comprise the current shared workspace identifier for the presenter appliance 140A. The presenter interaction location indicates a current location of presenter interaction within the shared workspace displayed in the viewport window 560A of the presenter display 120A. For example, the presenter interaction location may specify horizontal and vertical (x and y) coordinates of the presenter interaction. In some embodiments, the presenter interaction location is expressed in percentage values. In such embodiments, position (x, y) of the presenter interaction is represented in terms of percent locations along an x-axis (horizontal axis) and y-axis (vertical axis) of the shared workspace. For example, the x and y coordinates may be expressed as percentages of the shared workspace width and shared workspace height. The values for presenter identifier, presenter shared workspace identifier, and presenter interaction location may initially be set to null to indicate that presentation mode is not yet enabled.

Note that the messaging infrastructure 240 generates a message object for each appliance 140 and sends all the generated message objects to all appliances 140 that have opened the same project. In this regard, at step 1720, each appliance 140 receives and stores a message object for the appliance 140 as well as a message object for each other appliance 140 in the project. In some embodiments, each time an event at an appliance 140 triggers a change in any of the data in the message object for the appliance 140, the appliance 140 sends an updated message object with the updated data to the messaging infrastructure 240. In turn, the messaging infrastructure 240 responds by sending the updated message object to each of the other appliances 140 in the same project. In this manner, each viewer appliance 140 receives updated information regarding any new locations of presenter interactions and any changes in the presenter shared workspace, and then respond accordingly. The presenter appliance 140 also receives updates regarding the portion of the shared workspace currently displayed at each viewer appliance 140 to update the remote viewport boundary corresponding to each viewer appliance 140.

At step 1730, each appliance 140 then displays a first shared workspace of the project and all assets associated with the first shared workspace in the viewport window 560 of the display 120, as discussed above in relation to FIG. 9. At step 1740, each appliance 140 then configures and displays a preview window 570 (in the local display 120) for displaying a preview version of each shared workspace in the project, as discussed above in relation to FIG. 9. Each preview window 570 may comprise a user-interface (UI) control for enabling a user to 1) switch to a different shared workspace in the project (by selecting the corresponding preview shared workspace and 2) pan to different portions of the shared workspace as displayed in the viewport window 560. At step 1740, each appliance 140 also displays a local viewport boundary 720 in the preview window 570, the local viewport boundary comprising an interactive navigation window that enables panning of the shared workspace in the viewport window 560.

At step 1750, the presentation engine 1050A of the first appliance 140A receives a user selection to enable presentation mode (e.g., via presentation mode toggle 1620) with the first appliance 140A as the presenter appliance 140 and, in response, enables presentation mode and designates the first appliance 140A as the presenter appliance 140. In some embodiments, the presentation engine 1050A of the presenter appliance 140A does so by updating the entry for the presenter identifier in the local message object to identify itself as the presenter/presenter appliance 140A (e.g., by setting the presenter identifier to equal the connection identifier for the presenter appliance 140A). By setting the presenter identifier to a value other than null, this indicates to the other appliances 140 operating concurrently on a current workspace collaboration that presentation mode has been enabled and a presenter appliance 140 has been designated. Since the local message object has been updated, the presentation engine 1050A of the presenter appliance 140A also automatically sends (at step 1750) the updated message object to the messaging infrastructure 240. In turn, the messaging infrastructure 240 sends the updated message object to all other appliances 140 sharing the same project.

At step 1760, each appliance 140 receives the updated message object from the messaging infrastructure 240 and, in response, the presentation engine 1050 of each appliance 140 that is not identified as the presenter appliance 140A in the updated message object enables the presentation mode and designates itself as a viewer appliance 140. Since in presentation mode, only one appliance 140 is designated as the presenter appliance 140A, the remaining appliances 140 are automatically designated as viewer appliances 140. For example, the second appliance 140B and the third appliance 140C may be designated as viewer appliances 140. When in presentation mode and designated as a viewer appliance 140, the presentation engine 1050 of the viewer appliance 140 prevents local interactions with the shared workspace other than panning the shared workspace.

At step 1770, the presentation engine 1050A of the presenter appliance 140A determines if a presenter interaction with the shared workspace is has occurred. If not, the method 1700 continues at step 1790. If so, at step 1775, the presentation engine 1050A of the presenter appliance 140A determines the location of interaction in the shared workspace and updates the local message object. The presentation engine 1050A may modify the entry for the presenter interaction location in the local message object and send the updated message object to the messaging infrastructure 240, which responds by sending the updated message object to each of the viewer appliances 140. The presenter interaction location indicates a current location of presenter interaction within the shared workspace displayed in the viewport window 560A of the presenter display 120A and may be expressed in percentage values. For example, the presenter interaction location may be expressed as x and y percentages of the shared workspace width and shared workspace height, respectively.

At step 1780, the presentation engine 1050 of each viewer appliance 140 receives the updated message object from the messaging infrastructure 240 and, in response, displays a corresponding portion of the shared workspace that includes the presenter interaction location in the viewport window 560 of the local display 120. The presentation engine 1050 of each viewer appliance 140 may do so by converting the percentage values for the interaction location to pixel values that specify the interaction location within the local display based on the characteristics of the local display 120 or viewport window 560 (such as pixel dimensions and aspect ratio of the local display or viewport window). Thus, the presentation engine 1050 of each viewer appliance 140 may convert the x and y coordinates in percentage values to x and y coordinates in pixel values for the local display 120 or viewport window 560. At step 1780, the presentation engine 1050 of each viewer appliance 140 also updates the panning percentage (PanPercentage) in its local message object to reflect the new panning location within the shared workspace and sends the updated message object to the messaging infrastructure 240. In turn, the messaging infrastructure 240 sends the updated message object to all other appliances 140 sharing the same project.

At step 1785, the presentation engine 1050A of the presenter appliance 140A receives an updated message object from each viewer appliance 140 and displays a remote viewport boundary for each viewer appliance 140 in the viewport window 560A. The remote viewport boundary indicates a portion of the shared workspace that is currently displayed on a viewer display 120 of a corresponding viewer appliance 140. Each remote viewport boundary may have a different visual appearance for each different viewer appliance 140. The method 1700 then continues at step 1790.

At step 1790, the presentation engine 1050A of the presenter appliance 140A determines if a selection of a new shared workspace in the project is received. For example, the presenter may have selected the new shared workspace by selecting the preview version of the new shared workspace in the preview window 570A. If not, the method 1700 continues at step 1770. If so, at step 1795, the presentation engine 1050A of the presenter appliance 140A updates the local message object and sends the updated message object to the messaging infrastructure 240, which responds by sending the updated message object to each of the viewer appliances 140. The presentation engine 1050A of the presenter appliance 140A may update the local message object by modifying the entry for the presenter shared workspace identifier to specify the new shared workspace. The presenter shared workspace identifier may identify the particular shared workspace of the project that is currently displayed in the viewport window 560A of the presenter display 120A.

At step 1797, the presentation engine 1050 of each viewer appliance 140 receives the updated message object from the messaging infrastructure 240 and, in response, replaces the current shared workspace with the new shared workspace in the viewport window 560 of the local display 120. The presentation engine 1050 of each viewer appliance 140 may do so by removing from display the current shared workspace and associated assets and configuring and displaying the new shared workspace and all assets associated with the new shared workspace in the viewport window 560 of the display 120. The method 1700 then continues at step 1790.

At step 1790, the method 1700 may continue to receive new presenter interaction locations within a shared workspace at the presenter appliance 140A and each view appliance 140 may continue to update the portion of the shared workspace displayed in the viewport window 560 of the local display 120 to include the presenter interaction locations. The method 1700 may also continue to receive new shared workspace selections at the presenter appliance 140A and each view appliance 140 may continue to display the new shared workspaces in the viewport window 560 of the local display 120.

In alternative embodiments, the designation of the presenter/presenter appliance 140A may be changed to one of the viewers/viewer appliances 140 (such as the second appliance 140B or the third appliance 140C). This allows the presenter/presenter appliance 140A to give control of the presentation to a particular viewer appliance 140. In this regard, the presentation engine 1050A of the current presentation appliance 140A may receive a user selection designating a particular viewer appliance 140 as the new presentation appliance 140. The presentation engine 1050A of the current presenter appliance 140A then updates the entry for the presenter identifier in the local message object to identify the particular viewer appliance 140 as the new presenter/presenter appliance 140 (e.g., by setting the presenter identifier to equal the connection identifier for the particular viewer appliance 140). Since the local message object has been updated, the presentation engine 1050A of the current presenter appliance 140A automatically sends the updated message object to the messaging infrastructure 240. In turn, the messaging infrastructure 240 sends the updated message object to all other appliances 140 to update the designation of the presenter/presenter appliance 140.

Note that during the presentation mode, each viewer appliance 140 concurrently within a current workspace collaboration may also disable/opt-out of the presentation mode to perform independent panning of the shared workspace. For example, the viewer may select an interactive mode toggle to enable/disable the presentation mode or select and move a local viewport window displayed in the preview window 570, which automatically causes the presentation mode to be disabled. When the presenter/presenter appliance 140 interacts with a new location in the shared workspace, the presentation mode is automatically re-enabled on the viewer appliance 140.

In sum, a presenter device may make a presentation while interacting with a shared workspace while viewer devices watch the presentation of the shared workspace. A viewer device may display the shared workspace with the assigned aspect ratio and display only portion of the shared workspace in the viewport window of the local display at any given time. When the presenter device interacts with a particular location of the shared workspace, the presenter device operates in conjunction with the messaging infrastructure and the viewer devices to automatically cause each of the viewer devices to pan to and display the location of interaction in the shared workspace.

At least one advantage of the disclosed technique is that during a presentation of a shared workspace, the original aspect ratio of the shared workspace is maintained at each viewer device regardless of the aspect ratio of the local display of the viewer device and the number of concurrent viewers is variable. Thus, the layout appearance of the shared workspace in the presentation is consistent across all viewer devices. Another advantage of the disclosed technique is that when, during the presentation, the presenter interacts with a location of the shared workspace that is not currently displayed at a viewer device, the viewer device automatically pans to and displays the location of interaction in the shared workspace.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for sharing a first workspace with one or more client devices, the method comprising:
    displaying a first portion of the first workspace within a first display part of a first display associated with a first client device, wherein the first display has a smaller aspect ratio than an assigned aspect ratio associated with the first workspace; and
    while displaying the first portion of the first workspace in the first display part, displaying a first preview version of an entirety of the first workspace in a preview window displayed within a second display part of the first display, wherein the preview window comprises a user interface control mechanism that enables a user to pan to cause different portions of the first workspace to be displayed in the first display part of the first display.

2. The computer-implemented method of claim 1, wherein the first display displays the first workspace based on the assigned aspect ratio.

3. The computer-implemented method of claim 1, further comprising displaying a second preview version of a second workspace in the preview window, wherein the preview window further allows different workspaces to be selected.

4. The computer-implemented method of claim 3, further comprising:
    receiving a selection of the second preview version of the second workspace; and
    in response, displaying the second workspace within the first display.

5. The computer-implemented method of claim 1, further comprising displaying a remote viewport boundary within the first display that indicates a second portion of the first workspace currently displayed within a display associated with a remote client device.

6. The computer-implemented method of claim 1, further comprising displaying the entirety of the first workspace within a second display associated with a second client device, wherein the second display has an aspect ratio equal to or greater than the assigned aspect ratio.

7. The computer-implemented method of claim 1, further comprising displaying a first asset within the first workspace based on size and position values associated with the first asset, wherein the size and position values are expressed as percentage values that indicate a percent location along each of an x-axis and y-axis associated with the first workspace.

8. The computer-implemented method of claim 7, wherein displaying the first asset within the first workspace comprises converting the size and position percentage values to size and position pixel values based on pixel dimensions associated with the first display.

9. The computer-implemented method of claim 1, further comprising displaying a local viewport boundary within the preview window that indicates the first portion of the first workspace displayed within the first display, wherein the local viewport boundary comprises an interactive navigation window, where, when the local viewport boundary is moved to indicate a new portion of the first workspace, the new portion of the first workspace is displayed outside of the preview window within the first display.

10. A non-transitory computer-readable medium storing program instructions that, when executed by a processor, cause the processor to share a workspace with one or more client devices, by performing the steps of:
    displaying a first portion of the workspace within a first display part of a first display associated with a first client device, wherein the first display has a smaller aspect ratio than an assigned aspect ratio associated with the workspace; and
    while displaying the first portion of the workspace in the first display part, displaying a first preview version of an entirety of the workspace in a preview window displayed within a second display part of the first display, wherein the preview window comprises a user interface control mechanism that enables a user to pan to cause different portions of the workspace to be displayed in the first display part of the first display.

11. The non-transitory computer-readable medium of claim 10, wherein the first display displays the workspace based on the assigned aspect ratio.

12. The non-transitory computer-readable medium of claim 11, wherein:
    an aspect ratio is defined as a ratio of width to height;
    a pixel height of the workspace is set to equal a pixel height of the display; and
    a pixel width of the workspace is determined using the pixel height of the display and the assigned aspect ratio for the workspace.

13. The non-transitory computer-readable medium of claim 12, wherein the display at the client device displays an entire height of the workspace and a portion of an entire width of the workspace.

14. The non-transitory computer-readable medium of claim 11, wherein:
    an aspect ratio is defined as a ratio of height to width;
    a pixel width of the workspace is set to equal a pixel width of the display; and
    a pixel height of the workspace is determined using the pixel width of the display and the assigned aspect ratio for the workspace.

15. The non-transitory computer-readable medium of claim 14, wherein the display at the client device displays an entire width of the workspace and only a portion of an entire height of the workspace.

16. The non-transitory computer-readable medium of claim 10, wherein the preview window allows horizontal panning of the workspace.

17. The non-transitory computer-readable medium of claim 10, wherein the preview window allows vertical panning of the workspace.

18. The non-transitory computer-readable medium of claim 10, further comprising displaying a first asset within the workspace based on size and position values associated with the first asset, wherein the size and position values are expressed as percentage values that indicate a percent location along each of an x-axis and y-axis associated with the workspace.

19. A computer-implemented method for sharing a workspace with one or more client devices, the method comprising:

displaying a first portion of the workspace within a viewport window of a display associated with a client device, wherein the viewport window has a smaller aspect ratio than an assigned aspect ratio associated with the workspace; and while displaying the first portion of the workspace in the viewport window, displaying a preview version of an entirety of the workspace in a preview window displayed within a different display part of the display, wherein the preview window comprises a user interface control mechanism that enables a user to pan to cause different portions of the workspace to be displayed in the viewport window of the display.

20. The computer-implemented method of claim 19, further comprising displaying a local viewport boundary in the preview window, the local viewport boundary indicating the first portion of the workspace that is displayed in the viewport window, wherein the local viewport boundary comprises an interactive navigation window, where, when the local viewport boundary is moved to indicate a new portion of the first workspace, the new portion of the first workspace is displayed outside of the preview window within the display.

21. The computer-implemented method of claim 19, wherein the viewport window comprises a sub-area of a total display area associated with the display.

22. The computer-implemented method of claim 19, wherein the viewport window displays the workspace based on the assigned aspect ratio.

23. A non-transitory computer-readable medium storing program instructions that, when executed by a processor, cause the processor to share a workspace with one or more client devices, by performing the steps of:

displaying a first portion of the workspace within a first display associated with a first client device, wherein the first display has a smaller aspect ratio than an assigned aspect ratio associated with the workspace; and while displaying the first portion of the workspace, displaying a first preview version of an entirety of the workspace in a preview window displayed within the first display, wherein the preview window comprises a user interface control mechanism that enables a user to pan to different portions of the workspace, wherein the user interface control mechanism enables the user to pan the workspace along a single dimension of the workspace based on a relation between the aspect ratio of the first display and the assigned aspect ratio.

24. The non-transitory computer-readable medium of claim 10, wherein a second portion of the workspace is displayed within a first display part of a second display associated with a second client device, the second display and the first display have different aspect ratios, a second preview version of the entirety of the workspace is displayed in a second preview window displayed within a second display part of the second display, and the preview window has a different size than the second preview window.

25. The non-transitory computer-readable medium of claim 10, further comprising displaying a local viewport boundary within the preview window that indicates the first portion of the workspace displayed within the first display, wherein a second portion of the workspace is displayed within a first display part of a second display associated with a second client device, a second preview version of the entirety of the workspace is displayed in a second preview window displayed within a second display part of the second display, a second local viewport boundary is displayed within the second preview window that indicates the second portion of the workspace displayed within the second display, and the local viewport boundary indicates a different portion of the workspace than the second local viewport boundary.

* * * * *